United States Patent
Abe et al.

(10) Patent No.: US 11,567,749 B2
(45) Date of Patent: Jan. 31, 2023

(54) VEHICLE ELECTRONIC CONTROL SYSTEM, DATA RELAY DEVICE, CAMPAIGN INFORMATION DELIVERY CONTROL METHOD, AND CAMPAIGN INFORMATION DELIVERY CONTROL PROGRAM

(71) Applicant: DENSO CORPORATION, Kariya (JP)

(72) Inventors: Taiji Abe, Kariya (JP); Nao Sakurai, Kariya (JP)

(73) Assignee: DENSO CORPORATION, Kariya (JP)

( * ) Notice: Subject to any disclaimer, the term of this patent is extended or adjusted under 35 U.S.C. 154(b) by 268 days.

(21) Appl. No.: 17/093,697

(22) Filed: Nov. 10, 2020

(65) Prior Publication Data

US 2021/0149660 A1 May 20, 2021

(30) Foreign Application Priority Data

Nov. 14, 2019 (JP) .............................. JP2019-206198

(51) Int. Cl.
*G06F 8/65* (2018.01)
*B60K 35/00* (2006.01)

(52) U.S. Cl.
CPC ................ *G06F 8/65* (2013.01); *B60K 35/00* (2013.01); *B60K 2370/774* (2019.05); *B60K 2370/92* (2019.05)

(58) Field of Classification Search
USPC ....................................................... 717/171
See application file for complete search history.

(56) References Cited

U.S. PATENT DOCUMENTS

| 2012/0065815 A1* | 3/2012 | Hess | G06F 9/451 |
| | | | 701/2 |
| 2013/0157647 A1* | 6/2013 | Kolodziej | H04M 1/72403 |
| | | | 455/419 |
| 2015/0067567 A1* | 3/2015 | Langsdorf | G07C 5/00 |
| | | | 715/771 |

(Continued)

FOREIGN PATENT DOCUMENTS

| JP | 2007-004499 A | 1/2007 |
| JP | 2018-005894 A | 1/2018 |
| JP | 2018-125039 A | 8/2018 |

*Primary Examiner* — Qing Chen
*Assistant Examiner* — Clint Thatcher
(74) *Attorney, Agent, or Firm* — Harness, Dickey & Pierce, P.L.C.

(57) ABSTRACT

A vehicle electronic control system includes a center device and a master device and a data relay device capable of performing data communication therebetween. The center device obtains campaign information of the program update, transmits the obtained campaign information to the data relay device, and transmits the update data to the data relay device. When receiving the campaign information from the center device, the data relay device changes setting of the received campaign information and delivers the information to the master device, and, when receiving the update data from the center device, the data relay device delivers the received update data to the master device. When receiving the campaign information from the data relay device, the master device instructs a target electronic control device to update the program with the update data received from the data relay device according to the received campaign information.

12 Claims, 30 Drawing Sheets

(56) References Cited

U.S. PATENT DOCUMENTS

| | | | | |
|---|---|---|---|---|
| 2016/0170775 A1* | 6/2016 | Rockwell | ............ | G06F 13/4282 |
| | | | | 713/100 |
| 2017/0060559 A1* | 3/2017 | Ye | ............................. | G06F 8/65 |
| 2017/0262277 A1 | 9/2017 | Endo et al. | | |
| 2018/0065499 A1* | 3/2018 | Ogawa | .................. | B60K 6/445 |
| 2018/0074811 A1* | 3/2018 | Kiyama | .................. | H04L 67/59 |
| 2019/0163466 A1* | 5/2019 | Kiyama | .................. | H04W 4/44 |

* cited by examiner

FIG. 21

| ECU SW ID | ECU PROGRAM (OLD) | ECU PROGRAM (NEW) | INTEGRITY CHECK DATA FOR OLD PROGRAM | INTEGRITY CHECK DATA FOR NEW PROGRAM | UPDATE DATA (DIFFERENCE) | INTEGRITY CHECK FOR UPDATE DATA | ROLLBACK DATA (DIFFERENCE) | INTEGRITY CHECK DATA FOR ROLLBACK DATA |
|---|---|---|---|---|---|---|---|---|
| ads_002 | adsfile001 | adsfile002 | w1 | z1 | adsfile001-002 | x1 | adsfile002-001 | y1 |
| brk_005 | brkfile001 | brkfile005 | w2 | z2 | brkfile001-005 | x2 | brkfile005-001 | y2 |
| eps_011 | epsfile010 | epsfile011 | w3 | z3 | epsfile010-011 | x3 | epsfile011-010 | y3 |

32 ECU REPROG DATA DB

41 INDIVIDUAL VEHICLE INFORMATION DB

| VIN | VEHICLE MODEL | Vehicle SW ID | Digest | Sys ID | ECU ID | ECU SW ID | OPERATION PHASE | ACCESS LOG | REPROG STATUS |
|---|---|---|---|---|---|---|---|---|---|
| 1 | aaa | 0001 | xxxxxx | SA01_01 | ADS | aaa_ads_001 | — | 2018/12/10 07:05 | NONE |
| | | | | SA02_01 | ENG | aaa_eng_010 | A PHASE | | |
| | | | | SA02_01 | BRK | aaa_brk_001 | A PHASE | | |
| | | | | SA02_01 | EPS | aaa_eps_010 | A PHASE | | |
| | | | | ... | | | | | |
| 2 | aaa | 0002 | yyyyyy | SA01 | ADS | bbb_ads_002 | — | 2018/12/30 12:10 | ACTIVATION COMPLETE |
| | | | | ... | | | | | |
| 3 | bbb | 1001 | zzzzzz | SA01 | ADS | bbb_ads_001 | — | 2018/11/04 08:23 | DOWNLOAD COMPLETE |
| | | | | ... | | | | | |

| CAMPAIGN ID | PACKAGE ID | CAMPAIGN CONTENTS | TARGET VIN LIST | PRE-UPDATE VEHICLE SW ID | POST-UPDATE VEHICLE SW ID | PRE-UPDATE ECU SW ID LIST | POST-UPDATE ECU SW ID LIST |
|---|---|---|---|---|---|---|---|
| cpn_001 | pkg_001 | DESCRIPTION TEXT | ... | 0001 | 0002 | ads_001,brk_001, eps_010 | ads_002,brk_005, eps_011 |
| cpn_002 | pkg_002 | DESCRIPTION TEXT | ... | 1001 | 1002 | ... | ... |

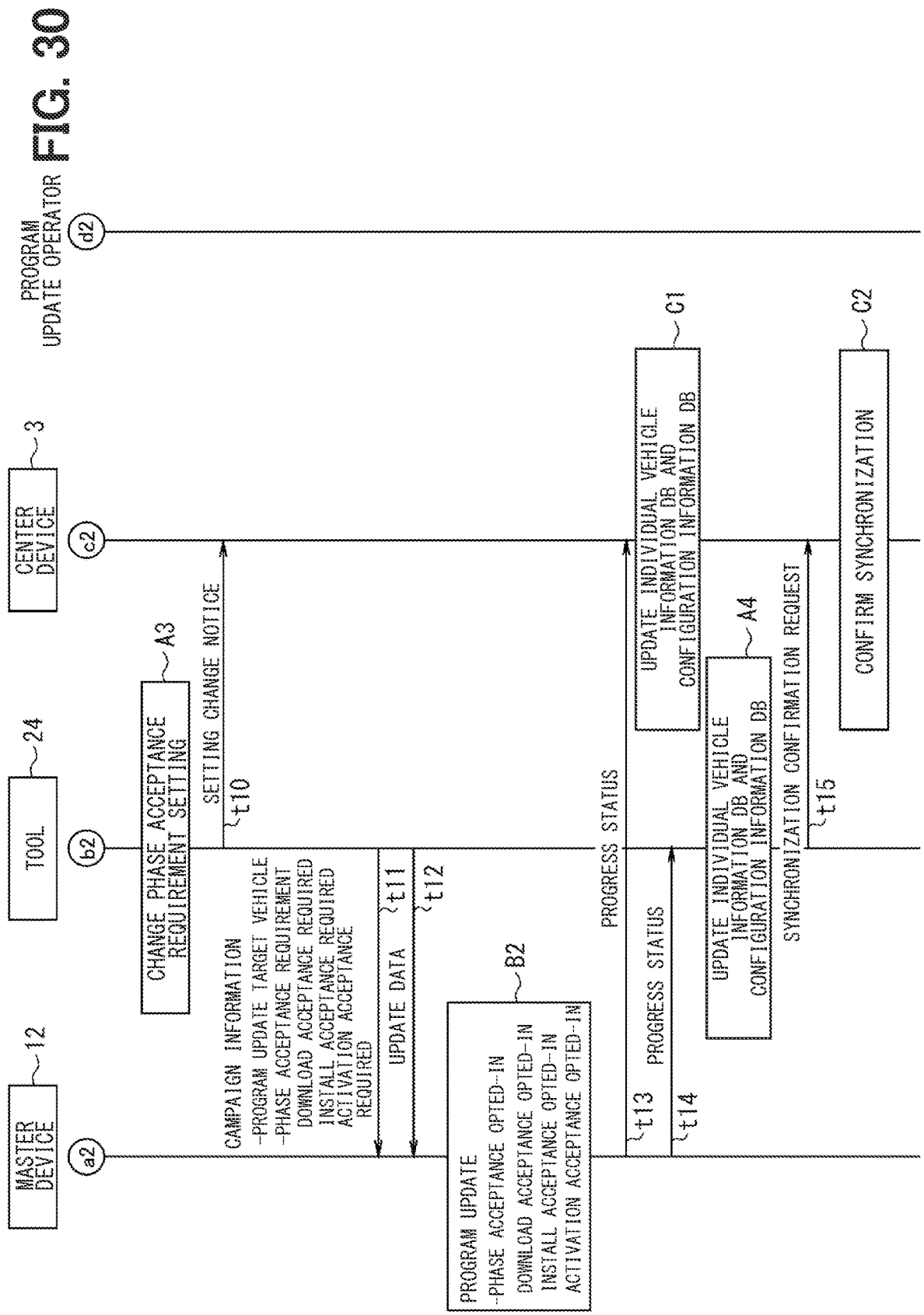

US 11,567,749 B2

VEHICLE ELECTRONIC CONTROL SYSTEM, DATA RELAY DEVICE, CAMPAIGN INFORMATION DELIVERY CONTROL METHOD, AND CAMPAIGN INFORMATION DELIVERY CONTROL PROGRAM

CROSS REFERENCE TO RELATED APPLICATION

The present application is based on and claims the benefit of priority of Japanese Patent Application No. 2019-206198, filed on Nov. 14, 2019, the disclosure of which is incorporated herein by reference.

TECHNICAL FIELD

The present disclosure generally relates to a vehicle electronic control system, a campaign information delivery control method, and a campaign information delivery control program.

BACKGROUND INFORMATION

In recent years, along with diversification of vehicle control such as a driving support function and an automatic driving function, the scale/size of the program is increasing in an electronic control device (hereinafter may also be referred to as ECU (Electronic Control Unit)) for the vehicle control, diagnosis and the like. In addition, with the present version of the program becoming outdated due to functional improvement and the like of the program, there are increasing opportunities to rewrite ("reprog" or reprogram) the program in ECU. On the other hand, with the development of communication network technologies, technologies related to connected cars are also prevailing. Under these circumstances, OTA (Over The Air) technology for re-write/overwrite programs in the target ECU in the vehicle is are enabled by (i) having a vehicle master device as a relay device on the vehicle side and (ii) delivering the update data downloaded wirelessly from the center device to the target ECU by using the vehicle master device.

SUMMARY

It is an object of the present disclosure to provide a vehicle electronic control system, a data relay device, a campaign information delivery control method, and a campaign information delivery control program capable of appropriately performing program update while avoiding (i) increase of processing load of communication network due to data communication between a center device and a vehicle master device over the network and (ii) increase of processing load of the center device for managing campaign information.

BRIEF DESCRIPTION OF THE DRAWINGS

Objects, features, and advantages of the present disclosure will become more apparent from the following detailed description made with reference to the accompanying drawings, in which:

FIG. 16 is a diagram of a screen when IG is turned ON;
FIG. 21 is a diagram of an ECU reprog data database;
FIG. 30 is a diagram of still yet another flow of processing.

DETAILED DESCRIPTION

Hereinafter, an embodiment of the present disclosure is described with reference to the drawings. A vehicle program rewrite system (corresponding to an in-vehicle electronic control system) is a system in which application programs for vehicle control, diagnosis and the like installed in an electronic control device (hereinafter referred to as an ECU (Electronic Control Unit)) are updatable/rewritable by OTA (Over The Air). In the present embodiment, an example where an application program is rewritten (i.e., updated) by wire or wirelessly is described. However, the present disclosure is applicable to a case where data used by various applications such as map data used by a map application and control parameters used by the ECU are rewritten by wire or wirelessly.

Rewriting of an application program by wire (i.e., via wired connection) includes not only rewriting of the program by obtaining the (new) application program (or new portions) from outside the vehicle via wired connection, but also rewriting by obtaining various data used in an execution of the application program from outside the vehicle via wired connection. Rewriting of the application program wirelessly (e.g., OTA) includes not only rewriting of the program by obtaining the (new) application program wirelessly from outside the vehicle, but also rewriting by obtaining various data used in an execution of the application program from outside the vehicle via wireless communication.

Figure 1:
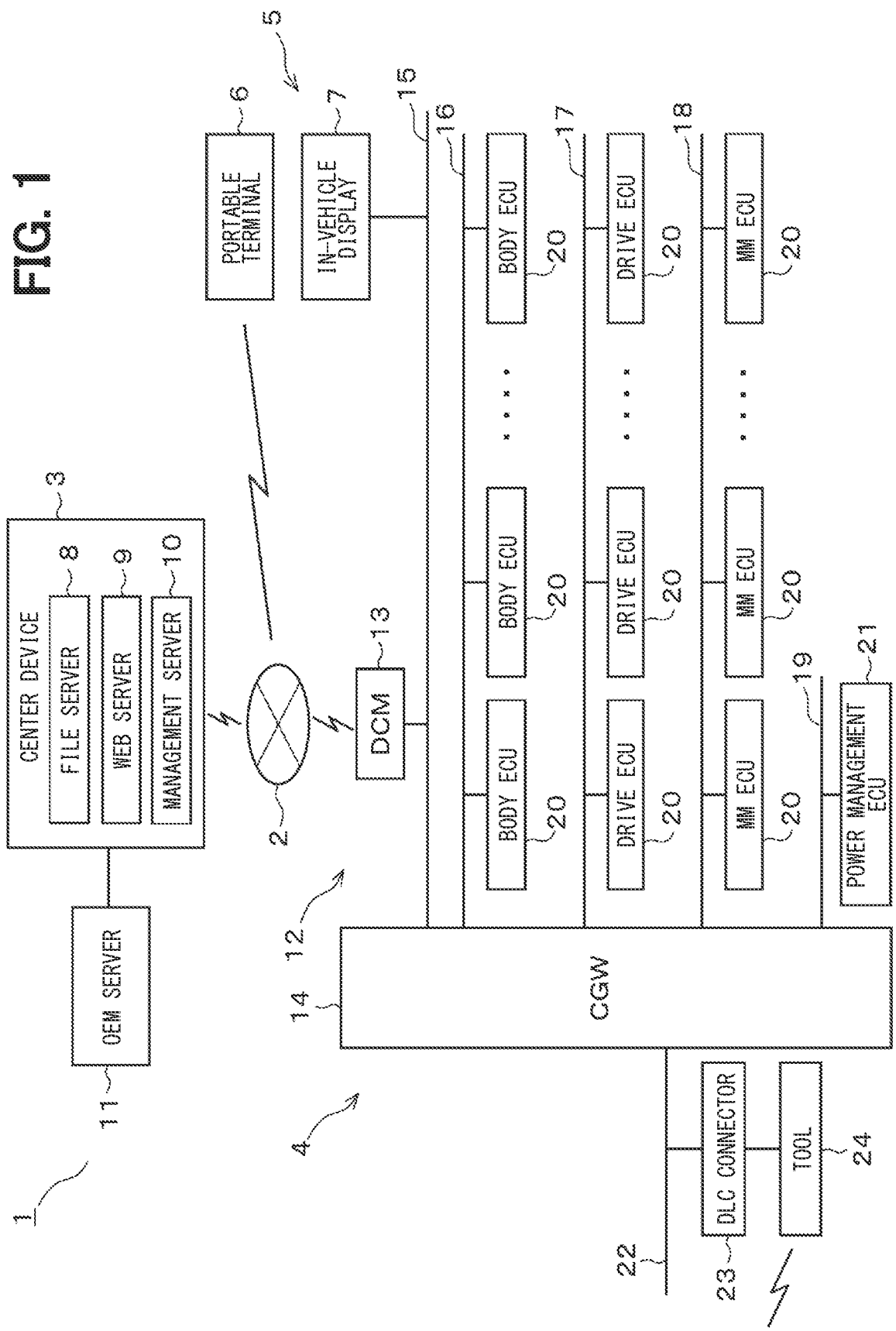
FIG. 1 is a diagram of an overall configuration of an embodiment.

As shown in FIG. 1, a vehicle program rewrite system 1 includes a center device 3 on a communication network 2 (i.e., on the network side), a vehicle system 4 provided in the vehicle, and a display terminal 5. The communication network 2 is configured to include a mobile communication network such as a 4G line, the Internet, and W-Fi (Wireless Fidelity) (registered trademark).

The display terminal 5 is a terminal having a function of receiving an operation input from a user and a function of displaying various screens, and is, for example, a portable terminal 6 such as a smartphone or a tablet that can be carried by the user, or is an in-vehicle display 7 arranged in a vehicle interior. The portable terminal 6 can perform data communication with the center device 3 via the communication network 2 as long as it is within a communication range of a mobile communication network. The in-vehicle display 7 is connected to the vehicle system 4, and may have a configuration that provides a navigation function. Further, the in-vehicle display 7 may also be an in-vehicle display ECU having a function of an ECU, or may have a function of controlling display on an center display, a meter display or the like.

A user is enabled to, if within a communication range of the mobile communication network and outside the vehicle, confirm various screens involved in rewriting the application program by the portable terminal 6 together with an operation input, and perform a procedure involved in rewriting the application program. In the vehicle interior, the user can perform an operation input while confirming various screens involved in rewriting the application program on the in-vehicle display 7, and can perform a procedure involved in rewriting the application program. That is, the user can properly use either the portable terminal 6 or the in-vehicle display 7 in or outside the vehicle compartment to perform a procedure involved in rewriting the application program.

The center device 3 controls a program update function on the communication network 2 side in the vehicle program rewrite system 1 and functions as an OTA center. The center device 3 has a file server 8, a web server 9, and a management server 10, and is configured such that a plurality of servers 8 to 10 having different functions can mutually perform data communication. Further, the center device 3 is data-communicably connected to an OEM server 11 managed by an OEM (i.e., Original Equipment Manufacturer).

The file server 8 is a server that manages files of application programs delivered from the center device 3 to the vehicle system 4. The file server 8 manages (i) update data provided by a supplier or the like who is a provider of the application program delivered from the center device 3 to the vehicle system 4, (ii) delivery specifications provided by an OEM, (Original Equipment Manufacturer), (iii) vehicle state obtained from the vehicle system 4, and the like. The file server 8 is capable of performing data communication with the vehicle system 4 via the communication network 2, and, when a delivery package download request occurs, the file server 8 transmits a delivery package to the vehicle system 4, in which reprog data and delivery specification data are packaged into one file.

The web server 9 is a server that manages web information. The web server 9 transmits web data managed by itself in response to a request from a web browser included in the portable terminal 6 or the like. The management server 10 is a server that manages personal information of users registered in the application program rewriting service, rewriting history of the application program for each vehicle, and the like.

The vehicle system 4 has a master device 12 (corresponding to a vehicle master device). The master device 12 has a DCM (Data Communication Module) 13 and a CGW (Central Gate Way) 14. Data communication is possible between the DCM 13 and the CGW 14 via a first bus 15. The DCM 13 performs data communication with the center device 3 via the communication network 2. When the delivery package is downloaded from the file server 8, the DCM 13 extracts write data from the downloaded delivery package, and transfers the extracted write data to the CGW 14.

When the CGW 14 has a data relay function and obtains the write data from the DCM 13, the CGW 14 instructs the rewrite target ECU that is a rewriting target of the application program to write the obtained write data, and delivers the write data to the rewrite target ECU. Further, when the writing of the write data is complete in the rewrite target ECU and the rewriting of the application program is complete, the CGW 14 instructs the rewrite target ECU to activate the rewrite-complete application program.

The master device 12 controls the program update function on the vehicle side in the vehicle program rewrite system 1, and functions as an OTA master. Note that, in FIG. 1, a configuration is illustrated in which the DCM 13 and the in-vehicle display 7 are connected to the same first bus 15. However, a configuration in which the DCM 13 and the in-vehicle display 7 are connected to different buses may also be used. Further, the CGW 14 may have a part or all of the functions of the DCM 13, or the DCM 13 may have a part or all of the functions of the CGW 14. That is, in the master device 12, the function sharing between the DCM 13 and the CGW 14 may be arbitrarily configurable. The master device 12 may be composed of two ECUs of the DCM 13 and the CGW 14, or may be composed of one integrated ECU having the function of the DCM 13 and the function of the CGW 14.

In addition to the first bus 15, a second bus 16, a third bus 17, a fourth bus 18, and a fifth bus 19 are connected to the CGW 14 as buses inside the vehicle for connection to various ECUs 20 via the buses 16 to 18, and a power management ECU 21 is connected via the bus 19.

The second bus 15 is, for example, a body-system network bus. The ECU 20 connected to the second bus 16 is an ECU that controls the body system. The ECU that controls the body system includes, for example, a door ECU that controls lock/unlock of a door, a meter ECU that controls display on a meter display, an air conditioner ECU that controls driving of an air conditioner, a window ECU that controls opening/closing of a window, a security ECU that is driven to prevent the vehicle from being stolen, and the like.

The third bus 17 is, for example, a drive-system network bus. The ECU 20 connected to the third bus 17 is an ECU that controls the drive system. The ECU that controls the drive system includes, for example, an engine ECU that controls a drive of an engine, a brake ECU that controls a drive of a brake, an ECT (Electronic Controlled Transmission) ECU that controls a drive of an automatic transmission, a power steering ECU that controls a drive of a power steering and the like.

The fourth bus 18 is, for example, a multimedia-system network bus. The ECU 20 connected to the fourth bus 18 is an ECU that controls multimedia systems. The ECU for controlling the multimedia system includes, for example, a navigation ECU for controlling a navigation system, an ETC ECU for controlling an electronic toll collection system (ETC) (registered trademark), and the like. The buses 16 to 18 may also be buses of a system other than the bus of the body network, the bus of the traveling network, and the bus of the multimedia network. Further, the number of buses and the number of ECUs 20 are not limited to the illustrated configuration. The power management ECU 21 is an ECU that manages power supply to the DCM 13, the CGW 14, various ECUs 20, and the like.

The sixth bus 22 is connected to the CGW 14 as a bus outside the vehicle. A DLC (Data Link Coupler) connector 23 to which a tool 24 (corresponding to a data relay device) is detachably connected is connected to the sixth bus 22. The buses 15 to 19 on the inside of the vehicle and the buses 22 on the outside of the vehicle are configured by CAN (Controller Area Network, registered trademark) buses, for example, and the CGW 14 conducts data communication between the DCM 13, the various ECUs 20, and a tool 24 in accordance with data communication standards and diagnostic communication standards (UDS (Unified Diagnosis Services): ISO 14229). Note that the DCM 13 and the CGW 14 may be connected via Ethernet, or a DLC connector 23 and the CGW 14 may be connected via Ethernet.

Further, the tool 24 is data-communicable with the center device 3 via the communication network 2, and is data-communicable with the master device 12 via a near-field communication network 46. That is, the tool 24 has a function of relaying data between the center device 3 and the master device 12. The near-field communication network 46 may be Wi-Fi (registered trademark), a wireless LAN according to a data communication standard IEEE802.11, or the like.

When the rewrite target ECU 20 receives write data from the CGW 14, the rewrite target ECU 20 rewrites the application program by writing the received write data in a flash memory. In the above-described configuration, the CGW 14 functions as a reprog master that delivers the write data to the rewrite target ECU 20 when receiving a write data obtain request from the rewrite target ECU 20. When the rewrite target ECU 20 receives the write data from the CGW 14, the rewrite target ECU 20 functions as a reprog slave that writes the received write data in the flash memory and rewrites the application program.

As modes of rewriting the application program, there are a mode of rewriting by wire and a mode of rewriting by wireless communication. The mode in which the application program is rewritten by wire is a mode in which the rewrite target ECU 20 is rewritten by using the application program obtained from the outside of the vehicle via wired connection. Specifically, when the tool 24 is connected to the DLC connector 23, the tool 24 transfers the write data to the CGW 14. The CGW 14 functions as a gateway, transmits a wired rewrite request to the rewrite target ECU 20, instructs the rewrite target ECU 20 to write (i.e., install) the write data, and delivers the write data transferred from the tool 24 to the rewrite target ECU 20. Delivering the write data to the rewrite target ECU 20 is, i.e., means, relaying the write data.

The mode of wirelessly rewriting the application program is a mode of rewriting the ECU 20 to be rewritten by using the application program that has been wirelessly obtained from the outside the vehicle. Specifically, when the delivery package is downloaded from the file server 8, the DCM 13 extracts the write data from the downloaded delivery package and transfers the write data to the CGW 14. The CGW 14 functions as a rewriting tool, instructs the rewrite target ECU 20 to write (i.e., install) the write data, and delivers the write data transferred from the DCM 13 to the rewrite target ECU 20.

As modes for diagnosing the ECU 20, there are a mode for diagnosing by wire (i.e., via wired connection) and a mode for diagnosing wirelessly (i.e., via wireless connection). In the mode of diagnosing the ECU 20 by wire, the ECU 20 is diagnosed from the outside of the vehicle via wired connection. Specifically, when the tool 24 is connected to the DLC connector 23, the tool 24 transfers a diagnostic request to the CGW 14. The CGW 14 functions as a gateway, transmits the diagnosis request to a diagnosis target ECU 20, and delivers a diagnosis command transferred from the tool 24 to the diagnosis target ECU 20. The diagnosis target ECU 20 performs a diagnosis process according to the diagnosis command received from the CGW 14.

In the mode of diagnosing the ECU 20 wirelessly, the ECU 20 is diagnosed wirelessly from outside the vehicle. Specifically, when the diagnosis command is transmitted from the center device 3 to the DCM 13 as a diagnostic request, the DCM 13 transfers the diagnosis command to the CGW 14. The CGW 14 functions as a gateway, and delivers the diagnosis command as a diagnostic request to the diagnostic target ECU 20. The diagnosis target ECU 20 performs a diagnosis process according to the diagnosis command received from the CGW 14.

In the configuration in which the application program of the rewrite target ECU 20 is rewritten by OTA, the program update is divided into a plurality of phases, and the phases are advanced stepwise to complete the program update.

Figure 2:
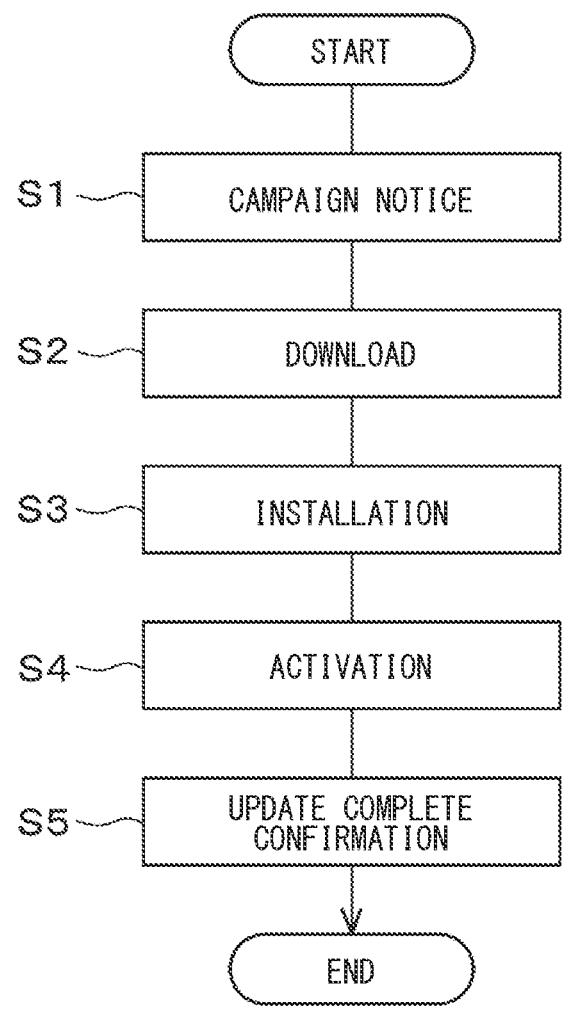
FIG. 2 is a diagram of phases in program update.

Specifically, as shown in FIG. 2, phases including campaign notice (S1), download (S2), installation (S3), activation (S4), and update complete confirmation (S5) are sequentially performed. In the campaign notice phase, the center device 3 delivers the campaign information to the vehicle system 4. In the download phase, 3 the master device 12 downloads, from the center device 3, the delivery package including the write data to the vehicle system 4. In the installation phase, the CGW 14 instructs the rewrite target ECU 20 to write the write data. In the activation phase, the rewrite target ECU 20 validates the write data. In the update complete confirmation phase, the completion of program update is notified.

Screens displayed on the display terminal 5 in those phases are described with reference to FIGS. 3 to 18. After a target vehicle of the program update is delivered from the yard to the user, basically, the user can proceed to the next phase by performing an acceptance operation in the phase. That is, in the campaign notice phase, the user can proceed to the download phase by performing a download acceptance operation. In the download phase, the user can proceed to the installation phase by performing an installation accepting operation. In the installation phase, the user can proceed to the activation phase by performing the activation accepting operation. Even after the target vehicle for program update is delivered from the yard to the user, in case of emergency situation or if the user has left/postponed the accepting operation for a long time, or even in other cases, it may be possible to proceed to the next phase without accepting operation performed by the user. The yard here means a place where the vehicle is managed in a state in which the vehicle is not in possession of the user, which may include places like a manufacturing factory where the vehicles are stored after manufacturing and before shipping, a transportation ship or transportation vehicle to transport vehicles from the factory, maintenance shops and dealers where the vehicles are stored for maintenance and inspection after shipment and the like.

Figure 3:
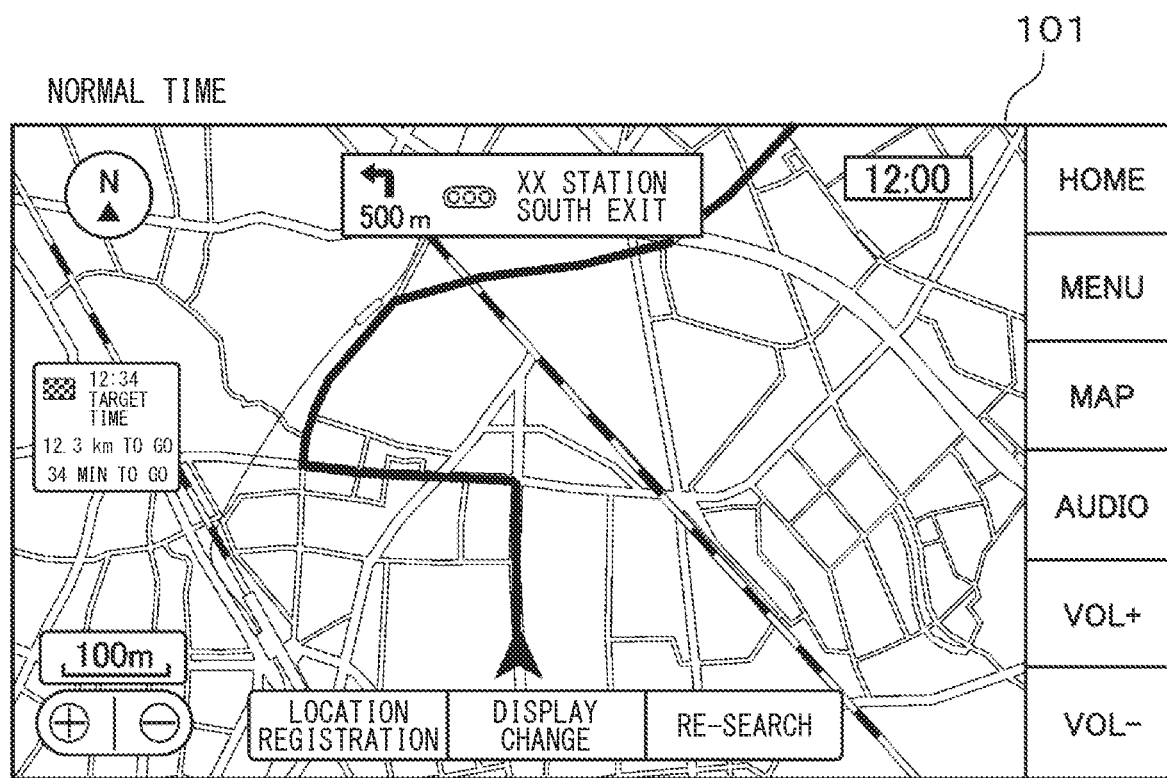
FIG. 3 is a diagram of a screen in a normal time.
Figure 4:
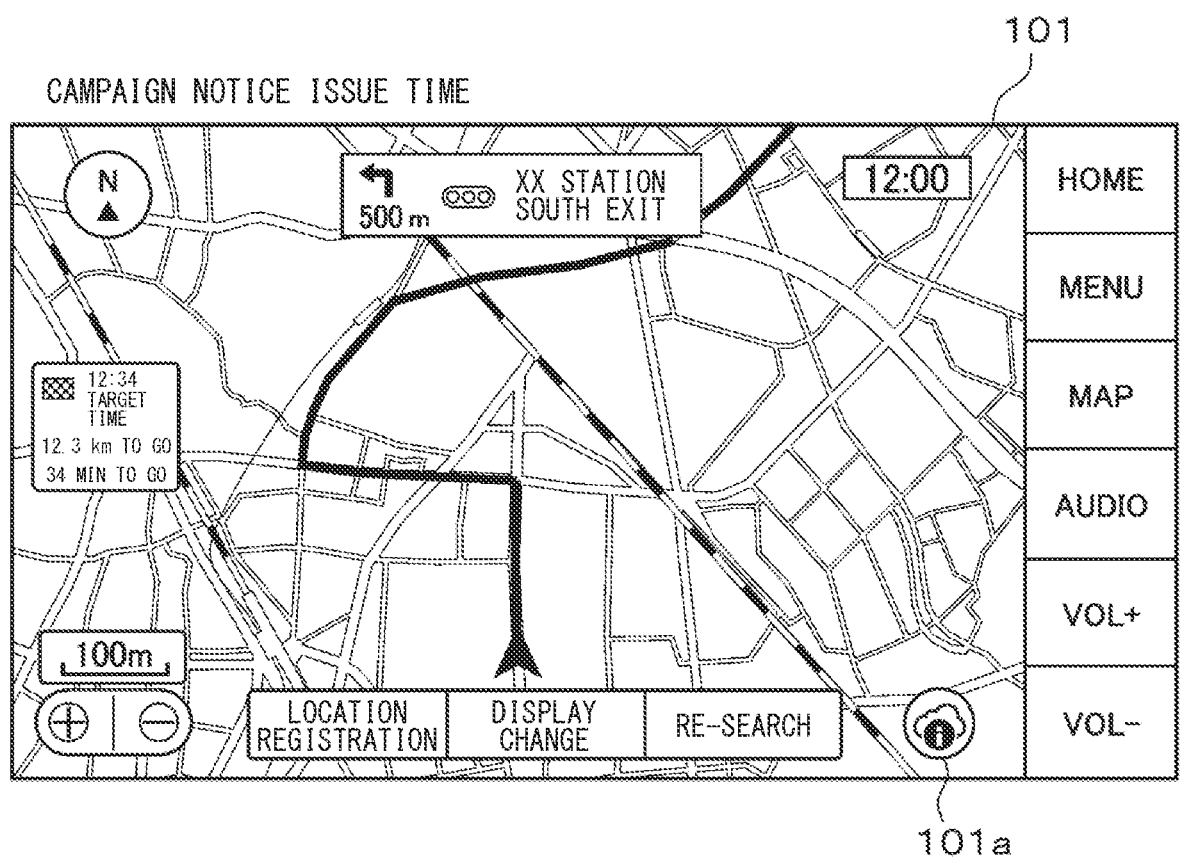
FIG. 4 is a diagram of a screen when a campaign notice is issued.

As shown in FIG. 3, the CGW 14 causes the in-vehicle display 7 to display, in a normal time before a campaign notice, a navigation screen 101 such as a well-known route guidance screen which is one of the navigation functions. When a campaign notice is issued from such a state, the CGW 14 displays a campaign notice icon 101a indicating an issuance of a campaign notice in a lower-right part of the navigation screen 101, as shown in FIG. 4. By recognizing/confirming the display of the campaign notice icon 101a, the user can recognize/understand that a campaign notice regarding the update of the application program has been issued.

Figure 5:
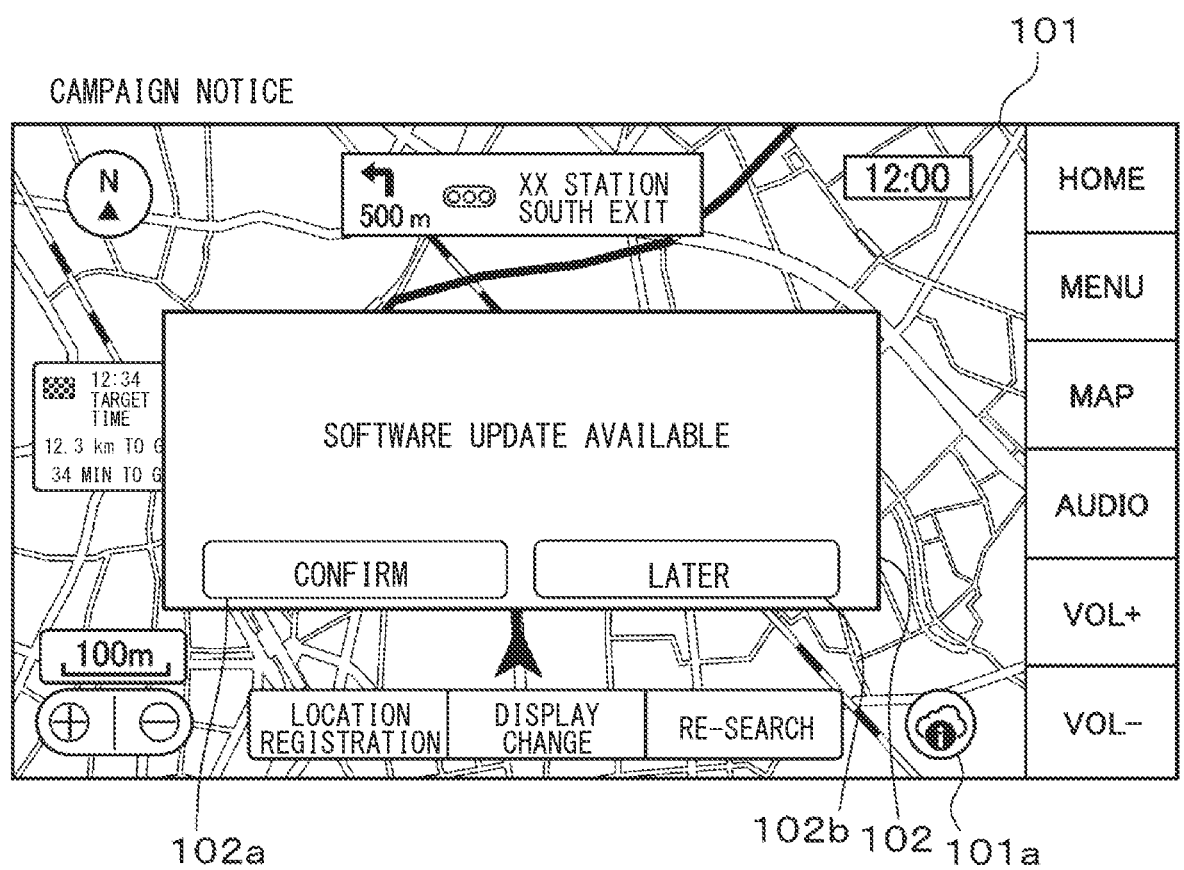
FIG. 5 is a diagram of a screen when a campaign notice is displayed.

When the user operates the campaign notice icon 101a in such a state, the CGW 14 pops up a campaign notice screen 102 on the navigation screen 101, as shown in FIG. 5. It should be noted that the CGW 14 is not limited to displaying the campaign notice screen 102 in a pop-up display, and other display modes may be adoptable. On the campaign notice screen 102, the CGW 14 notifies the user of the campaign notice by displaying, for example, a guidance "software update available" and also displays a "CONFIRM" button 102a and a "LATER" button 102b, and waits for user operation. In such a case, the user can proceed to the next screen for starting the rewriting of the application program by operating the "CONFIRM" button 102a. When the user operates the "LATER" button 102b, the CGW 14 erases the pop-up display of the campaign notice screen 102, and returns to the screen displaying the campaign notice icon 101a as shown in FIG. 4.

Figure 6:
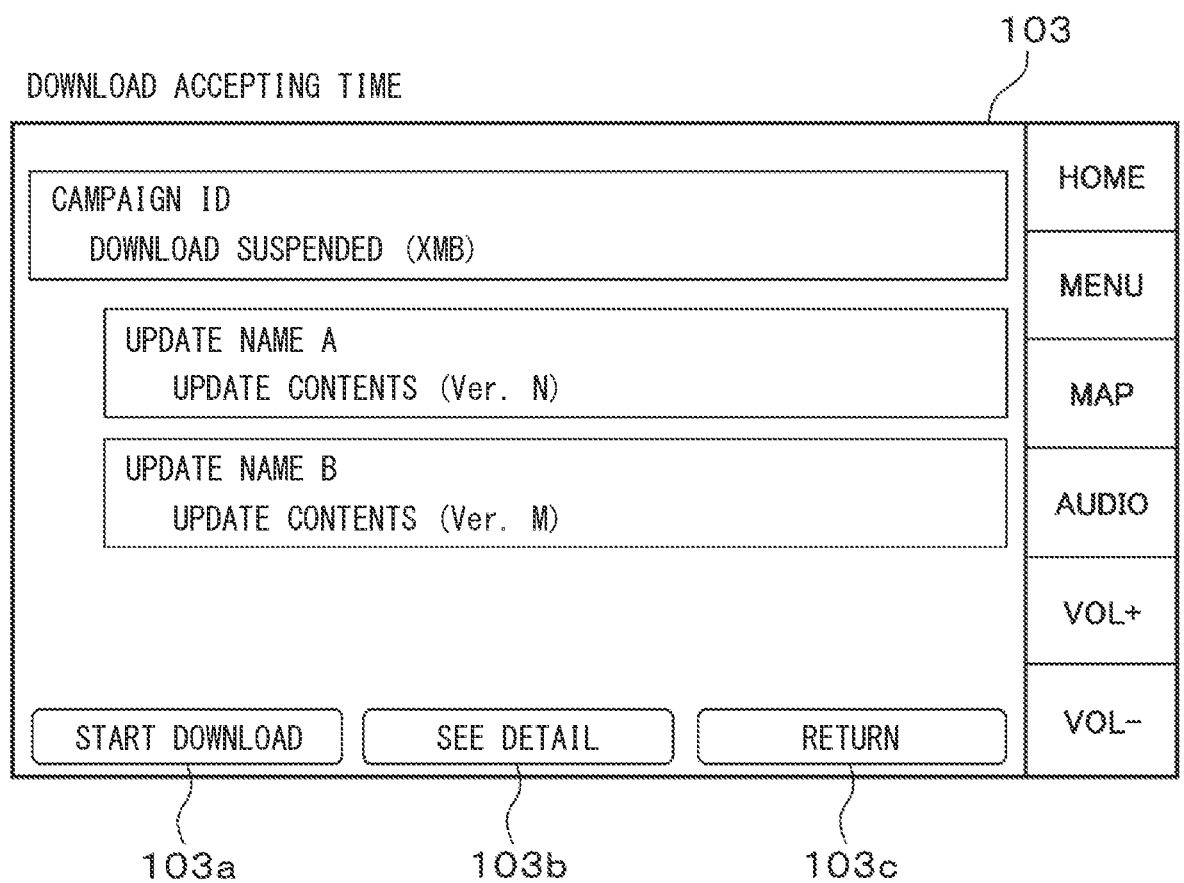
FIG. 6 is a diagram of a screen when a download is accepted.

When the user operates the "CONFIRM" button 102a in such a state, the CGW 14 switches the display from the navigation screen 101 to a download acceptance screen 103, and displays the download acceptance screen 103 on the in-vehicle display 7, as shown in FIG. 6. The CGW 14 informs the user of a campaign ID and an update name on the download acceptance screen 103, displays a "START DOWNLOAD" button 103a, a "SEE DETAIL" button 103b, and a "RETURN" button 103c, and waits for user operation. In such a case, the user can start the download by operating the "START DOWNLOAD" button 103a. That is, the user operating the "START DOWNLOAD" button 103a corresponds to the term "download acceptance operation" in the claims. Further, the user can display and confirm the details of the download by operating the "SEE DETAIL" button 103b, and can reject the download and return to the previous screen by operating the "RETURN" button 103c.

Figure 7:
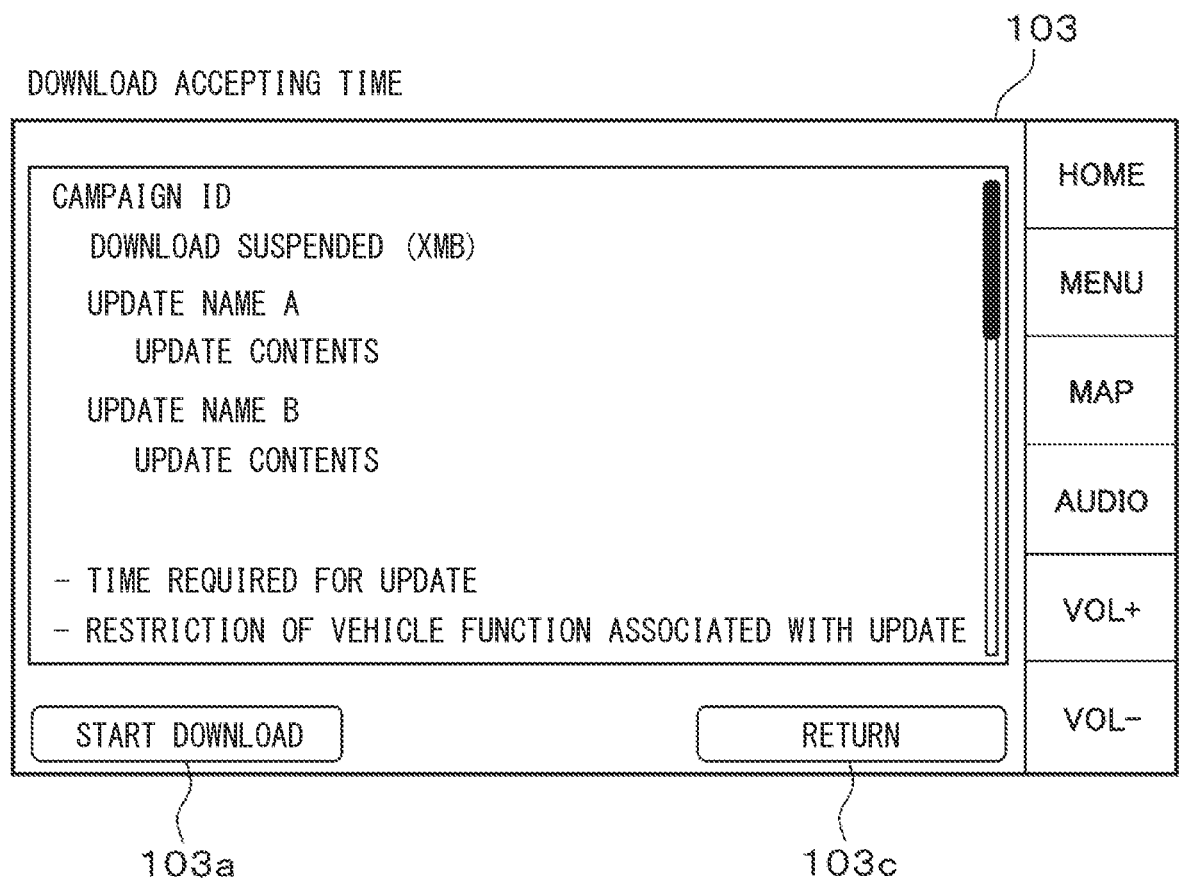
FIG. 7 is a diagram of another screen when a download is accepted.
Figure 8:
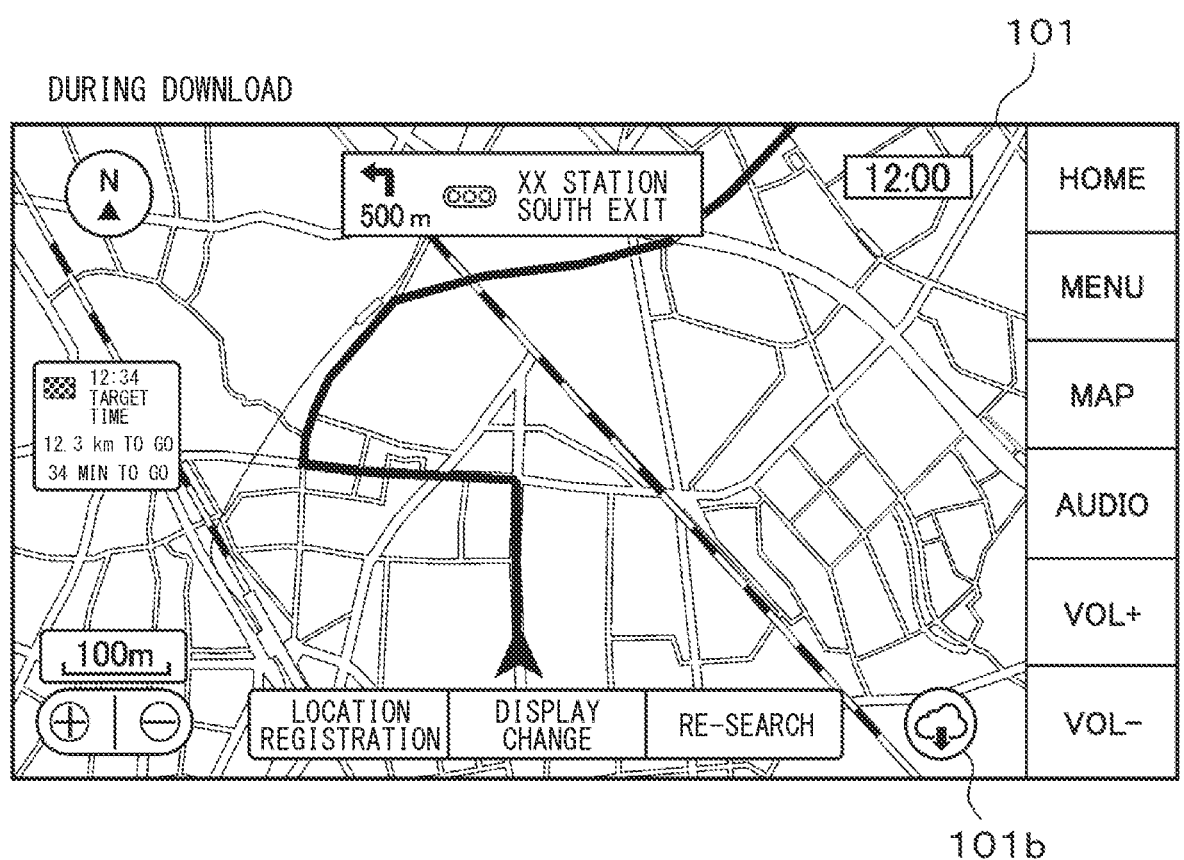
FIG. 8 is a diagram of a screen during a download.

When the user operates the "SEE DETAIL" button 103b in such a state, the CGW 14 switches the display content of the download acceptance screen 103, and displays the details of the download on the in-vehicle display 7, as shown in FIG. 7. The CGW 14 displays, according to the delivery specification data, update contents, time required for the update, restriction(s) of the vehicle function associated with the update, and the like as the details of the download. When the user operates the "START DOWNLOAD" button 103a, the CGW 14 starts downloading the delivery package from the center device 3. In parallel with starting the download of the delivery package, the CGW 14 switches the display from the download acceptance screen 103 to the navigation screen 101, causes the navigation screen 101 to be displayed again on the in-vehicle display 7 as shown in FIG. 8, and displays a download-in-progress icon 101b indicating that download is in progress in the lower right part of the screen 101. The user can confirm that the delivery package is being downloaded by confirming the display of the download-in-progress icon 101b.

Figure 9:
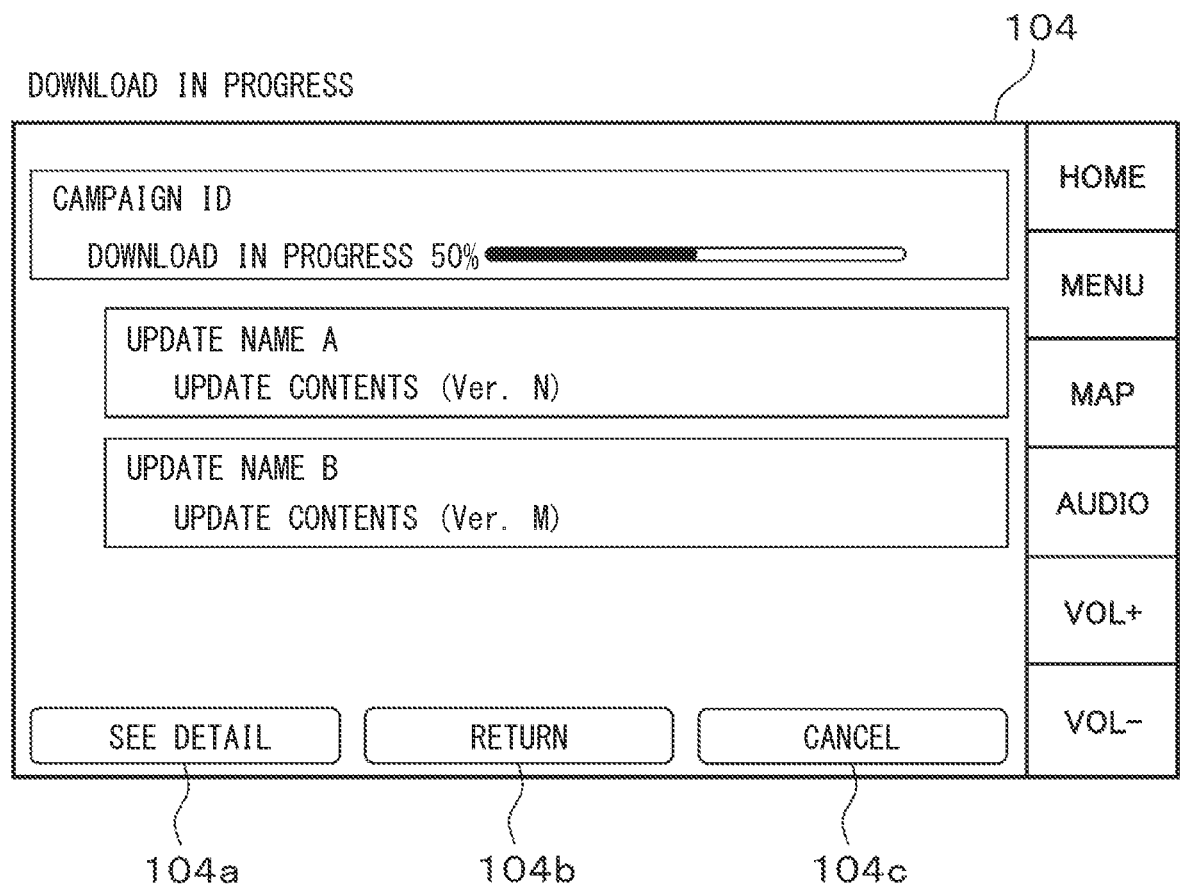
FIG. 9 is a diagram of another screen during a download.

When the user operates the download-in-progress icon 101b in such a state, the CGW 14 switches the display from the navigation screen 101 to a download-in-progress screen 104, and displays the download-in-progress screen 104 on the in-vehicle display 7, as shown in FIG. 9. On the download-in-progress screen 104, the CGW 14 notifies the user that the download is being executed, i.e., in progress, displays a "SEE DETAIL" button 104a, a "RETURN" button 104b, and a "CANCEL" button 104c, and waits for user operation. In such a case, the user can display the details of the download being executed by operating the "SEE DETAIL" button 104a, and/or can interrupt the download by operating the "CANCEL" button 104c.

Figure 10:
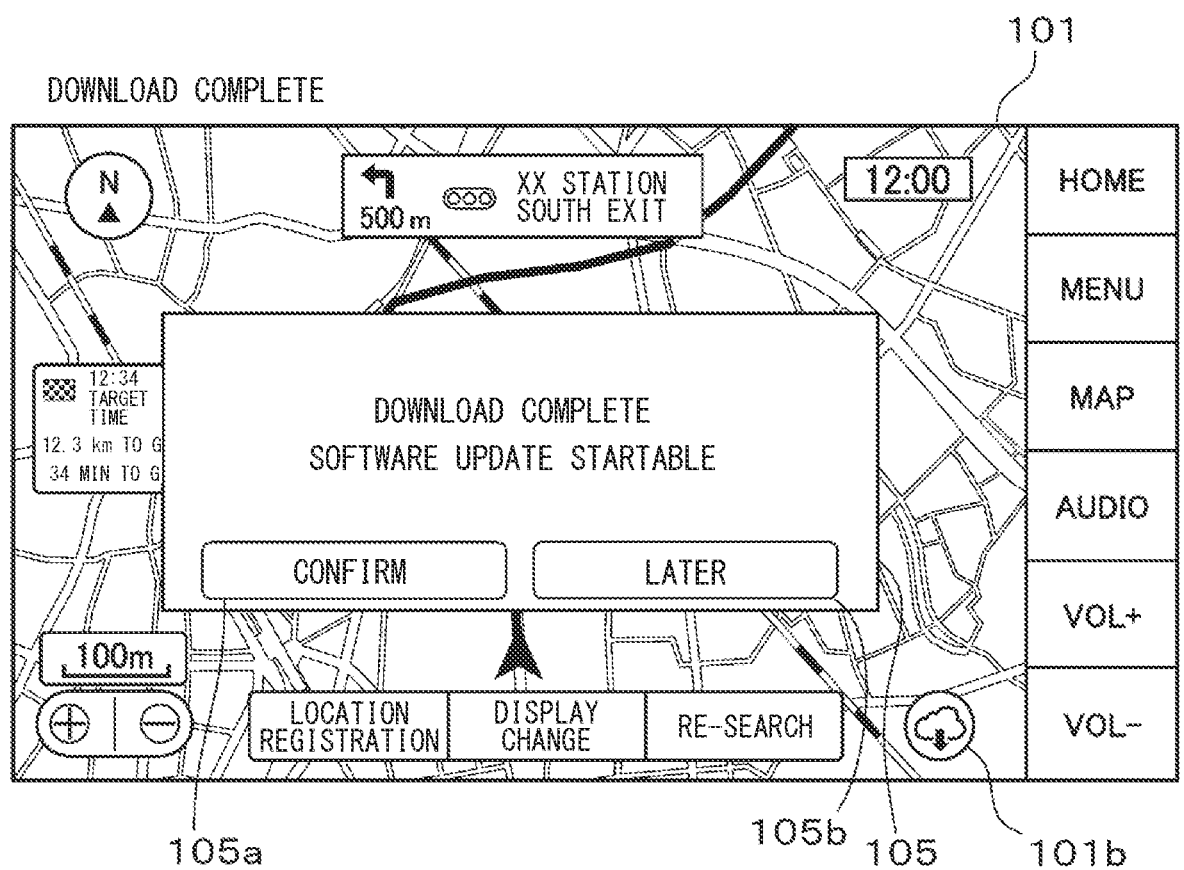
FIG. 10 is a diagram of a screen when a download is complete.

When the download of the delivery package is complete, the CGW 14 pops up a download complete notification screen 105 on the navigation screen 101 as shown in FIG. 10. On the download complete notification screen 105, the CGW 14 notifies the user of the completion of the download by displaying, for example, a guidance "DOWNLOAD IS COMPLETE, SOFTWARE UPDATE STARTABLE", and a "CONFIRM" button 105a and a "LATER" button 105b are displayed to wait for a user operation. In such a case, the user can proceed to the screen for starting the installation by operating the "CONFIRM" button 105a.

Figure 11:
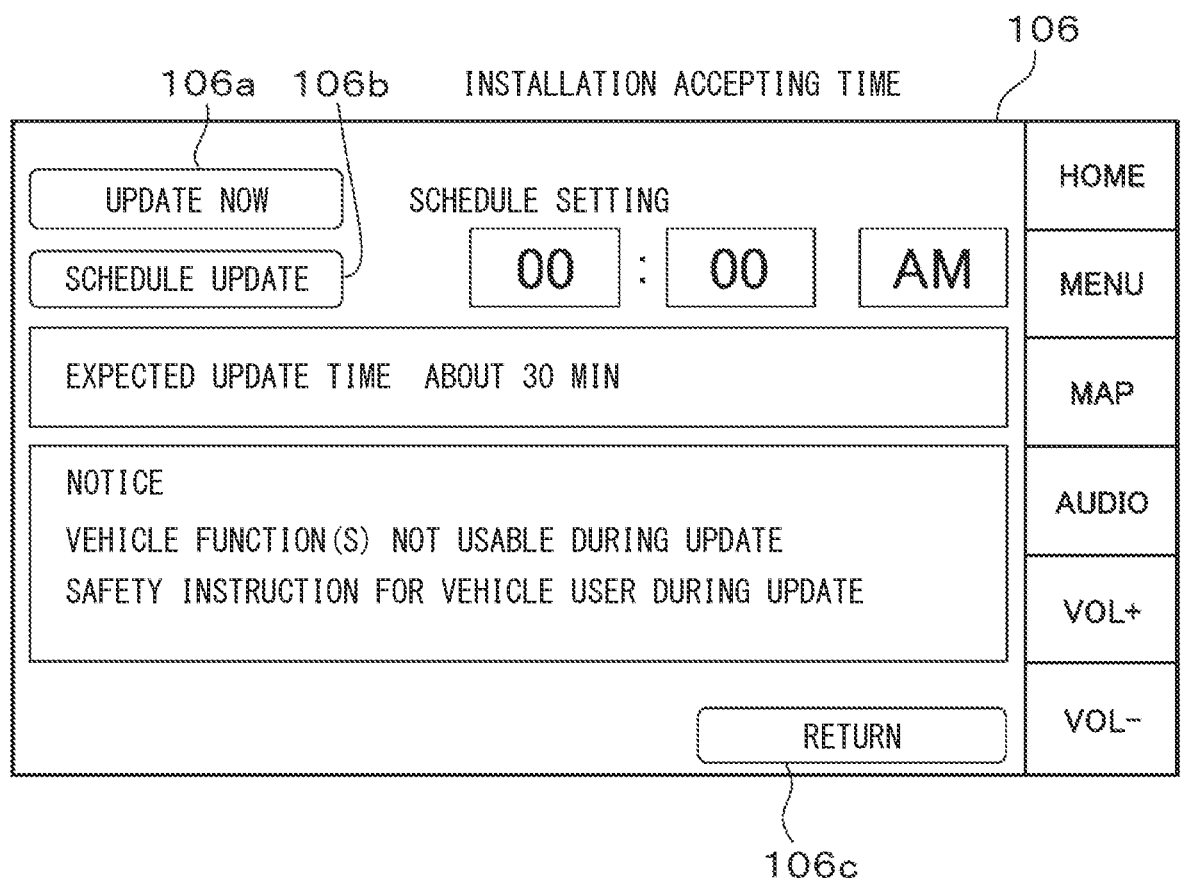
FIG. 11 is a diagram of a screen when an installation is confirmed.

When the user operates the "CONFIRM" button 105a in such a state, the CGW 14 switches the display from the navigation screen 101 to an installation acceptance screen 106, and displays the installation acceptance screen 106 on the in-vehicle display 7, as shown in FIG. 11. On the installation acceptance screen 106, the CGW 14 informs the user of time required for installation, restrictions regarding installation, and schedule settings thereof, and also displays an "UPDATE NOW" button 106a, a "SCHEDULE UPDATE" button 106b, and a "RETURN" button 106c, and waits for user operation. In such a case, the user can start the installation immediately by operating the "UPDATE NOW" button 106a, or can set time of the installation, i.e., can schedule desired time for the installation to be performed by operating the "SCHEDULE UPDATE" button 106b. That is, the user (i) operating the "UPDATE NOW" button 106a or (ii) setting the desired time of the installation and operating the "SCHEDULE UPDATE" button 106b corresponds to an installation acceptance operation in the claims. Also, the user can reject/cancel the installation and return to the previous screen by operating the "RETURN" button 106c.

Figure 12:
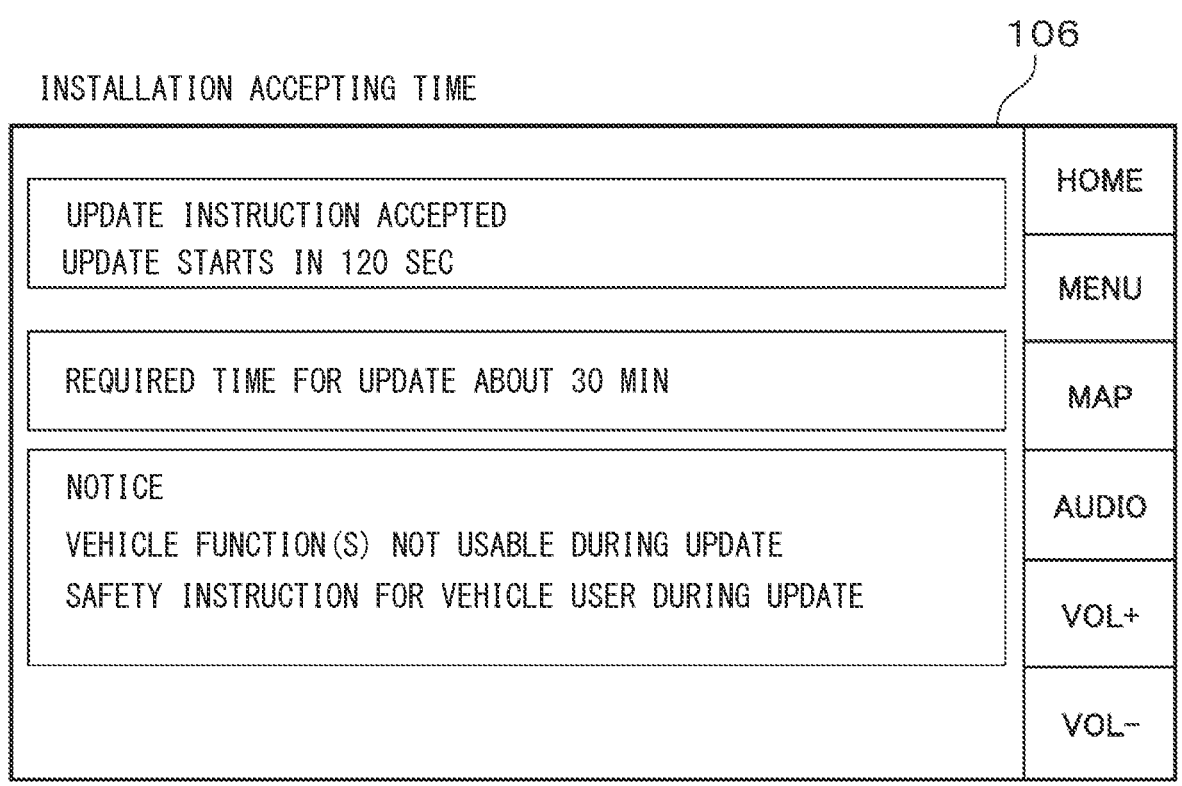
FIG. 12 is a diagram of another screen when an installation is confirmed.

When the user operates the "UPDATE NOW" button 106a in such a state, the CGW 14 switches the display content of the installation acceptance screen 106, and displays the details of the installation on the in-vehicle display 7, as shown in FIG. 12. The CGW 14 notifies the user, on the installation acceptance screen 106, that an installation request has been accepted and the installation is started.

Figure 13:
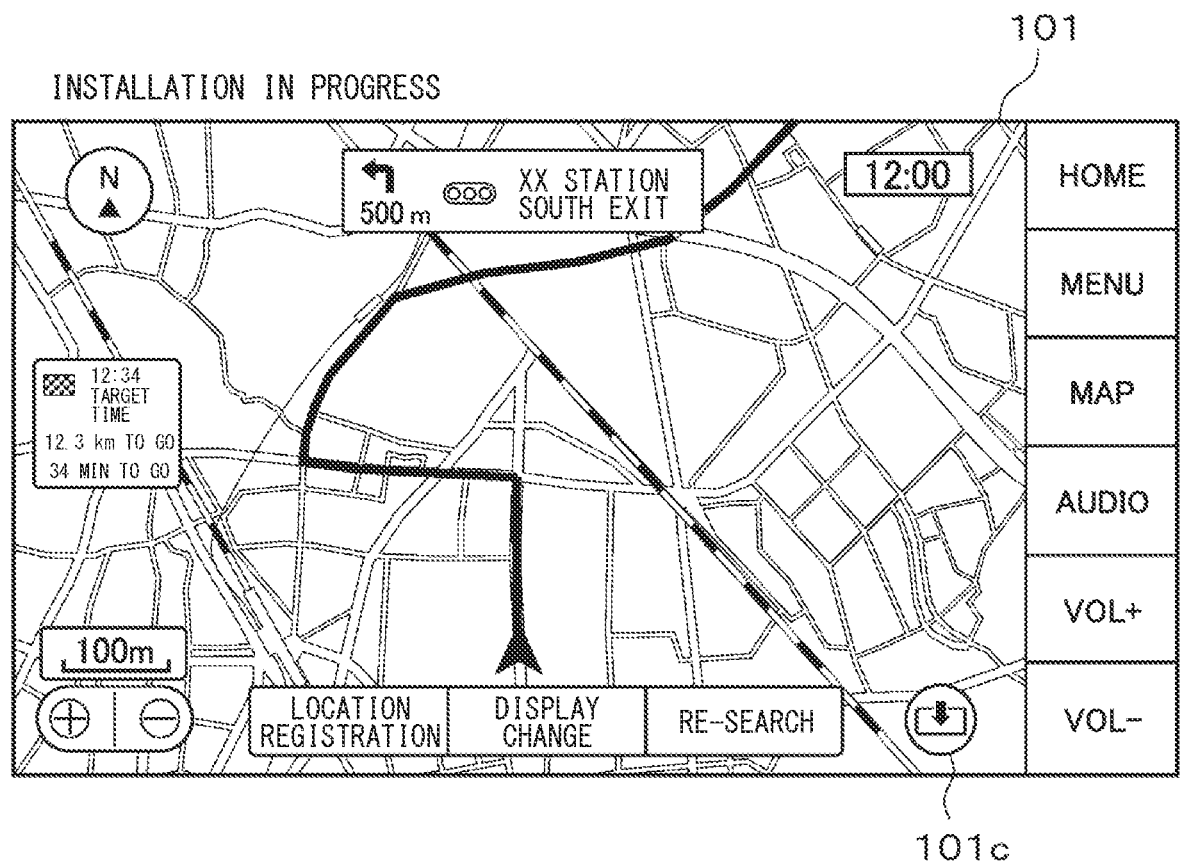
FIG. 13 is a diagram of a screen during an installation.

When the installation is started, the CGW 14 switches the display from the installation acceptance screen 106 to the navigation screen 101, causes the navigation screen 101 to be displayed again on the in-vehicle display 7 as shown in FIG. 13, and displays an install-in-progress icon 101c indicating that the installation is being executed in the lower right part of the navigation screen 101. The user can recognize that the installation is in progress by checking the display of the installation-in-progress icon 101c.

Figure 14:
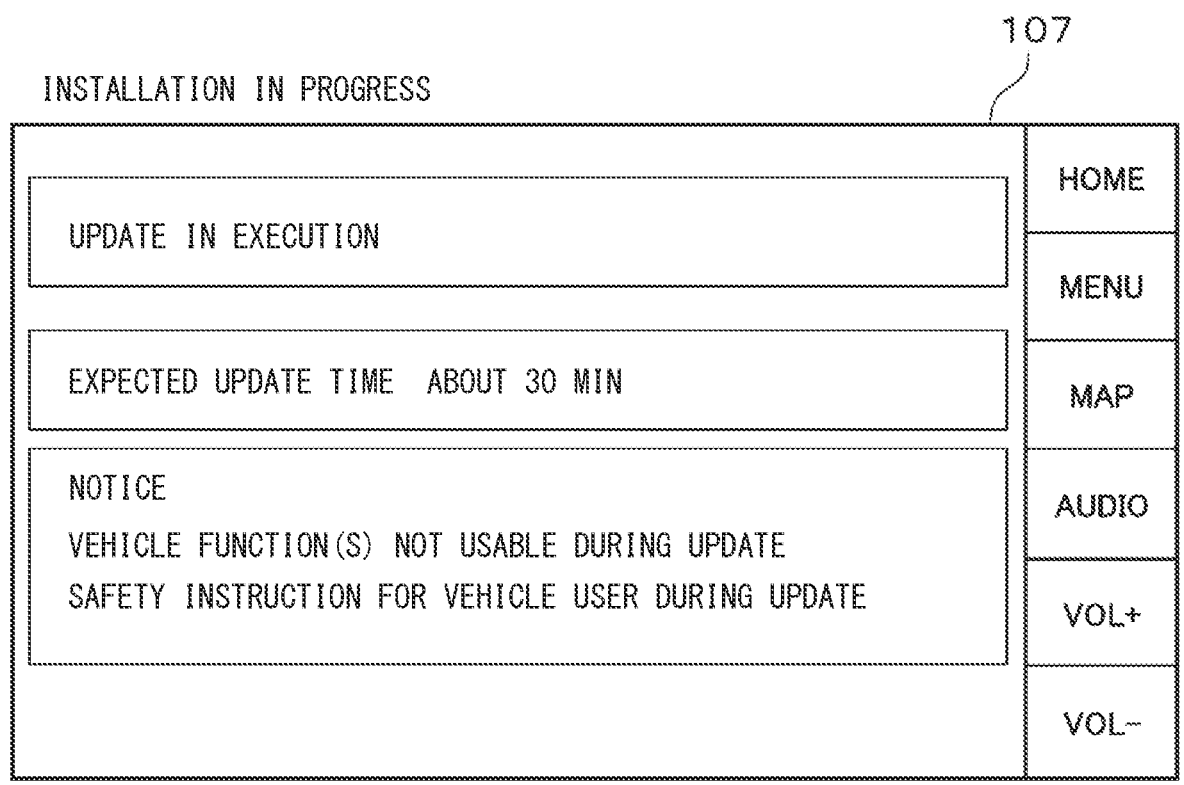
FIG. 14 is a diagram of another screen during an installation.

When the user operates the installation-in-progress icon 101c in such a state, the CGW 14 switches the display from the navigation screen 101 to an installation-in-progress screen 107, and displays the installation-in-progress screen 107 on the in-vehicle display 7, as shown in FIG. 14. The CGW 14 informs the user that the installation is in progress on the installation-in-progress screen 107. The CGW 14 may display, for example, a remaining time and a progress percentage as the progress of the installation on the installation in progress screen 107.

Figure 15:
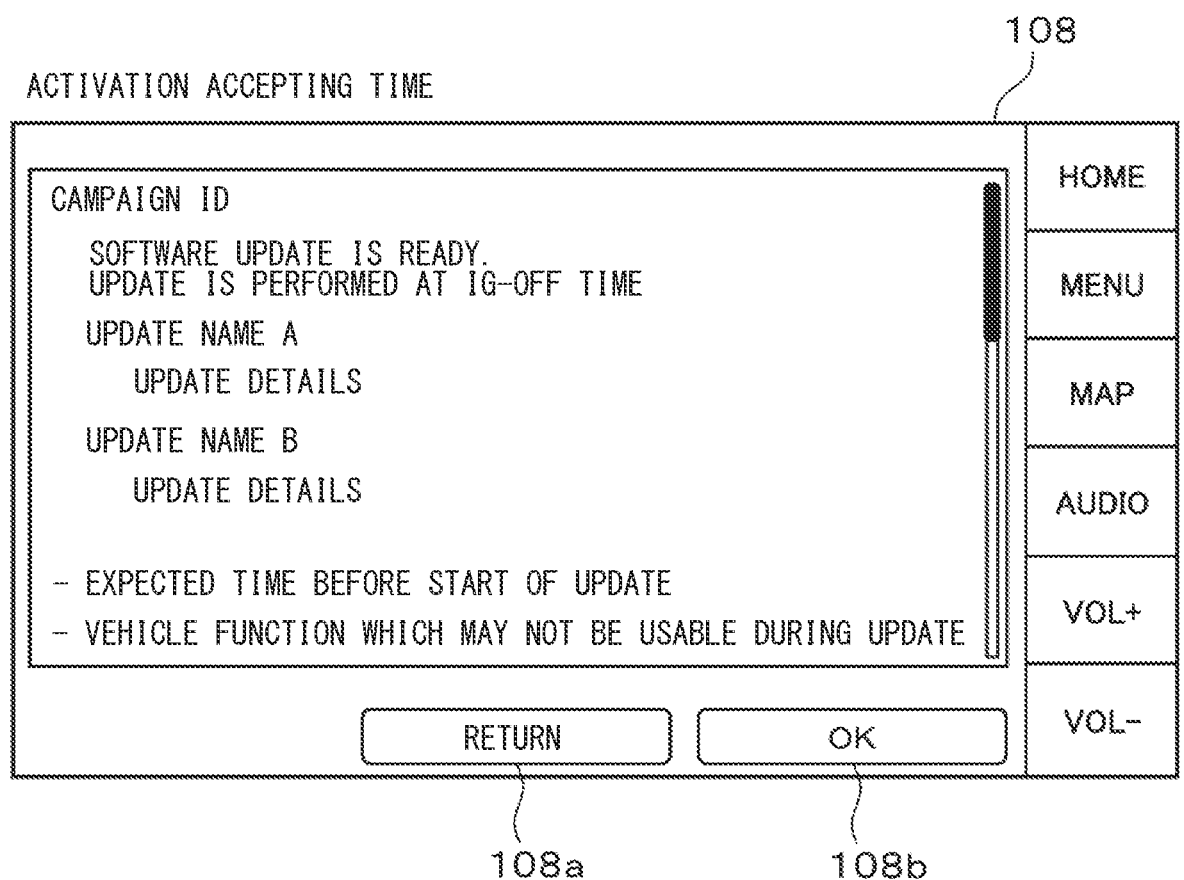
FIG. 15 is a diagram of a screen when activation is confirmed.

When the installation is complete, the CGW 14 switches the display from the navigation screen 101 to an activation acceptance screen 108, and displays the activation acceptance screen 108 on the in-vehicle display 7, as shown in FIG. 15. On the activation acceptance screen 108, the CGW 14 informs the user of the contents of the activation, displays a "RETURN" button 108a and an "OK" button 108b, and waits for user operation. In such a case, the user can reject/cancel the activation and return to the previous screen by operating the "RETURN" button 108a. Further, the user can accept the activation by operating the "OK" button 108b. That is, the user operating the "OK" button 108b corresponds to an activation acceptance operation in the claims.

Figure 16:
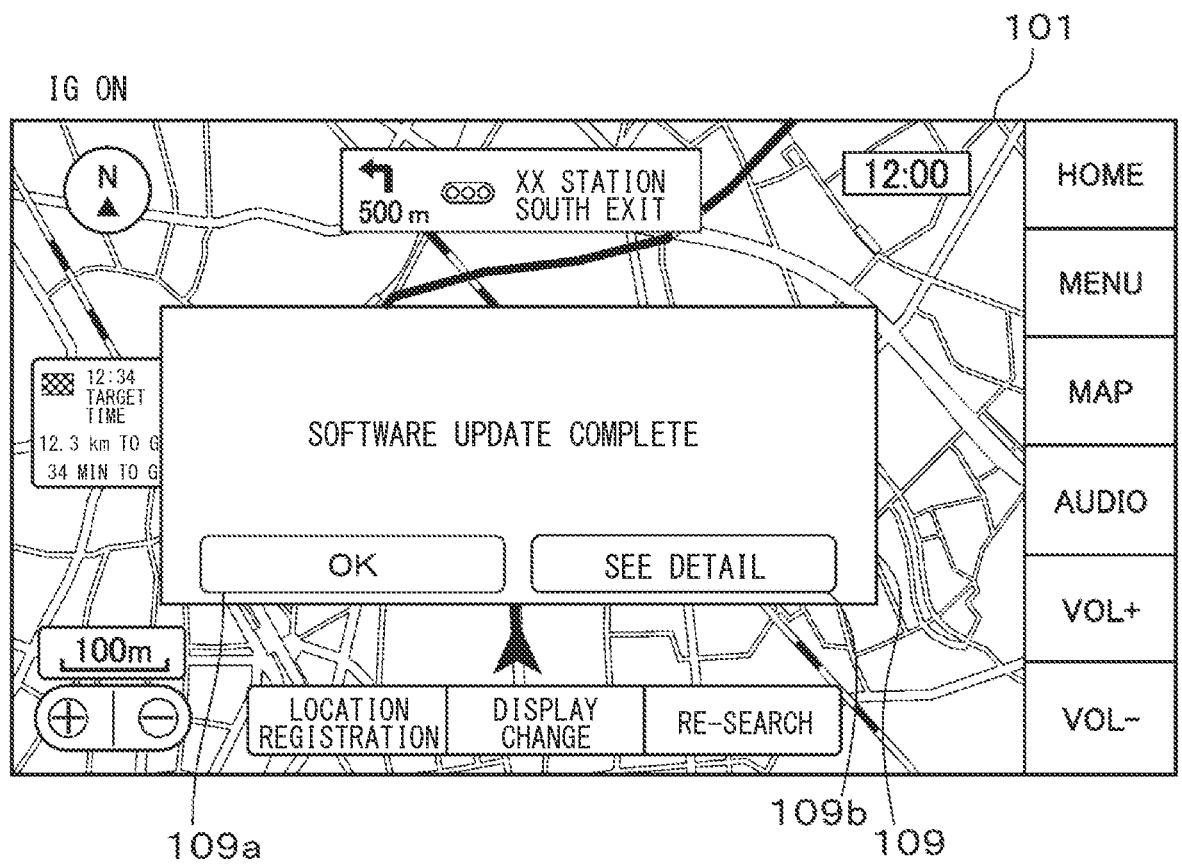

When the user operates the "OK" button 108b in such a state and then the user turns on an ignition (IG) power, the CGW 14 pops up an activation complete notification screen 109 on the navigation screen 101, as shown in FIG. 16. On the activation complete notification screen 109, the CGW 14 notifies the user of the completion of activation by displaying, for example, a guidance "SOFTWARE UPDATE IS COMPLETE," and also displays an "OK" button 109a and a "SEE DETAIL" button 109b, and waits for user operation. In such a case, the user can erase the popup display of the activation complete notification screen 109 by operating the "OK" button 109a, and can confirm/display the details of the completed activation by operating the "SEE DETAIL" button 109b.

Figure 17:
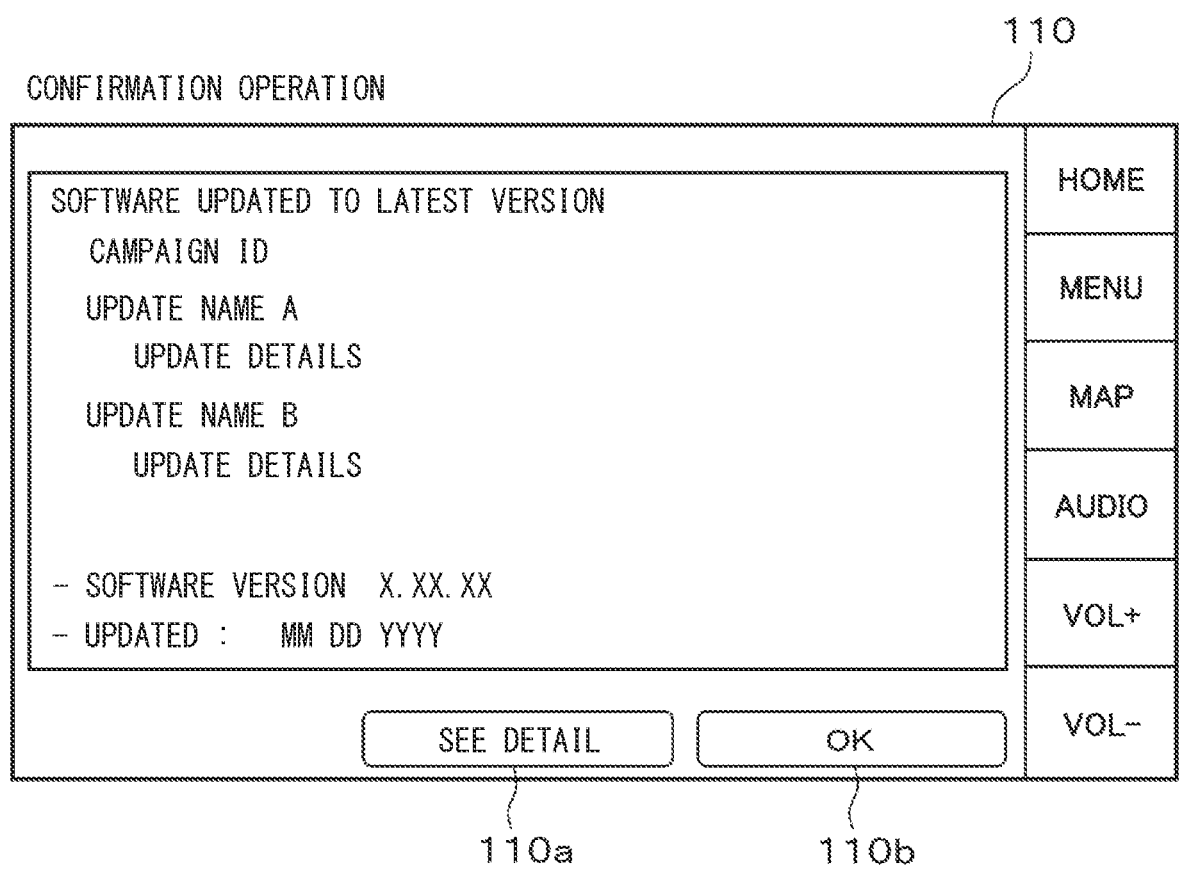
FIG. 17 is a diagram of a screen during confirmation operation.

When the user operates the "OK" button 109a in such a state, the CGW 14 switches the display from the navigation screen 101 to a confirmation operation screen 110, and displays the confirmation operation screen 110 on the in-vehicle display 7, as shown in FIG. 17. On the confirmation operation screen 110, the CGW 14 informs the user of the completion of activation, displays a "SEE DETAIL" button 110a and an "OK" button 110b, and waits for user operation. In such a case, the user can display the details of the completed activation by operating the "SEE DETAIL" button 110a.

Figure 18:
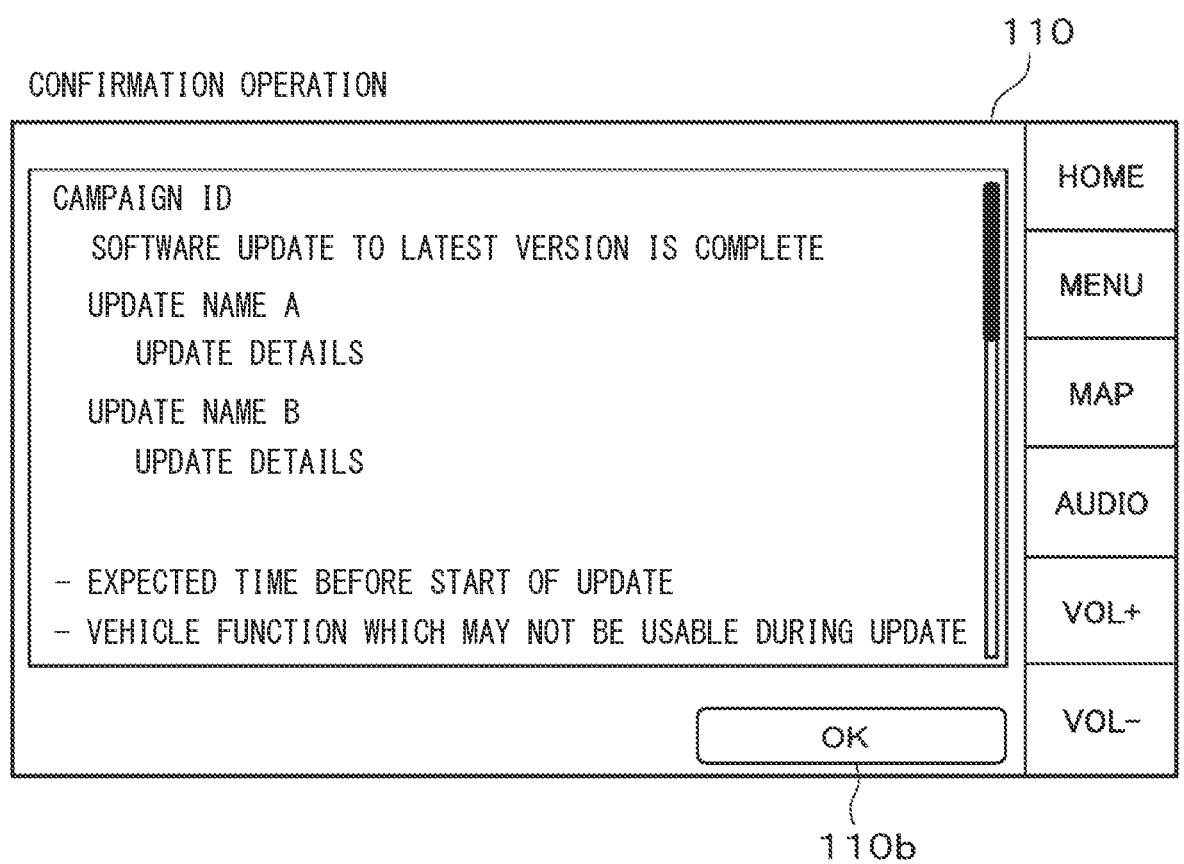
FIG. 18 is a diagram of another screen during confirmation operation.

When the user operates the "SEE DETAIL" button 110a in such a state, the CGW 14 switches the display content of the confirmation operation screen 110 as shown in FIG. 18, and displays changed/added functions by the program update and the like as the details of the completed activation on the in-vehicle display 7, together with the "OK" button 110b.

As described above, after the target vehicle of the program update is delivered from the yard to the user, basically, the user can shift/advance a certain phase to the next phase by performing the acceptance operation in the relevant phase (i.e., respective phases). That is, the CGW 14 advances the program update to the download phase when the user performs the download acceptance operation, and advances the program update to the installation phase when the user performs the installation acceptance operation, and advances the program update to the activation phase when the user performs the activation acceptance operation.

Here, a configuration of the center device 3 is described in the following.

Figure 19:
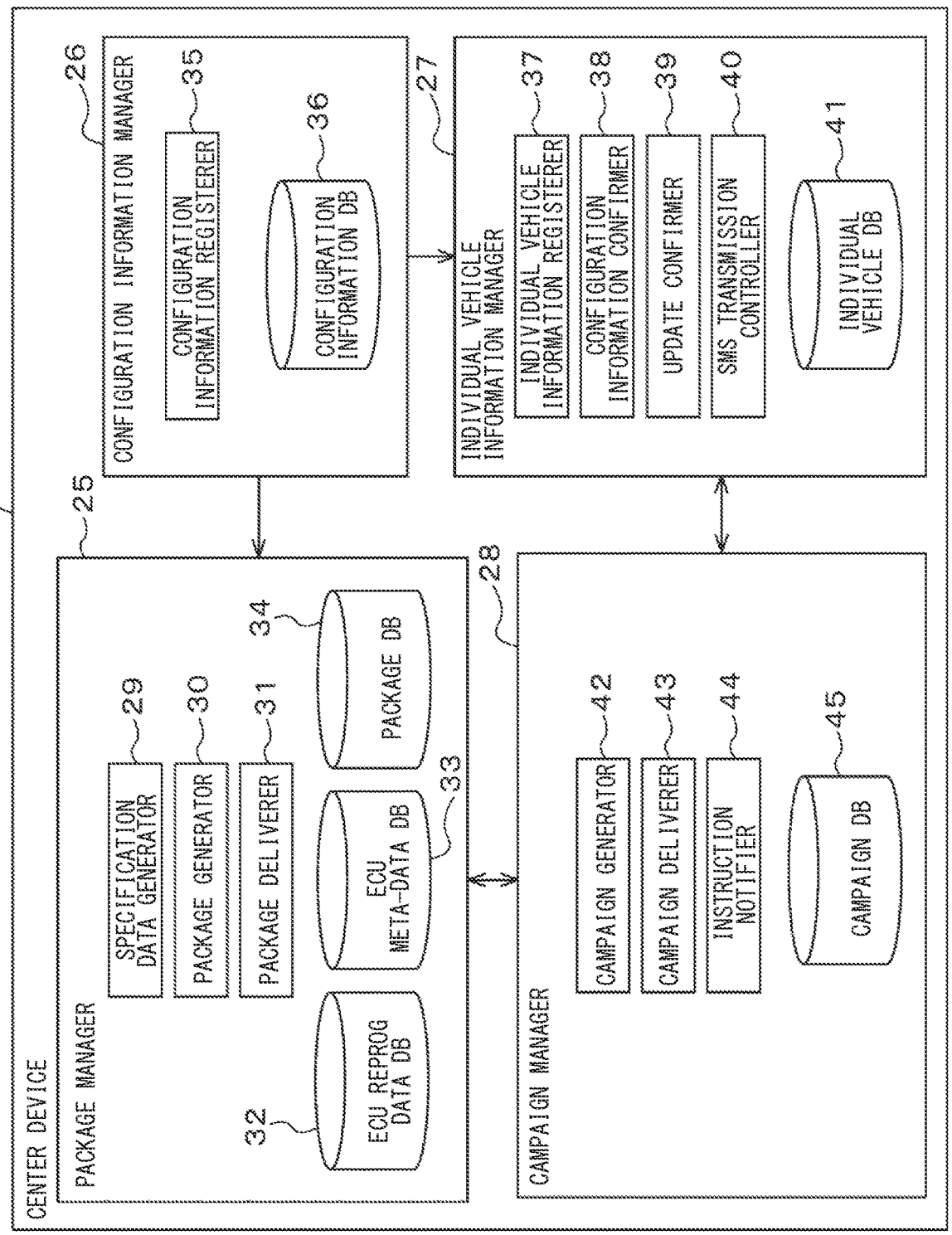
FIG. 19 is a functional block diagram of a center device.

As shown in FIG. 19, the center device 3 has a package manager 25, a configuration information manager 26, an individual vehicle information manager 27, and a campaign manager as functional blocks of the respective functions of the servers 8 to 10 described above.

The package manager 25 includes a specification data generator 29, a package generator 30, a package deliverer 31, an ECU reprog data DB (i.e., Database) 32, an ECU meta-data DB 33, and a package DB 34. The specification data generator 29 refers to each DB, and generates rewriting specification data. The package generator 30 generates a delivery package including the rewriting specification data and reprog data, and registers the generated delivery package in the package DB 34. The package generator 30 may generate a delivery package including delivery specification data. The package deliverer 31 delivers the delivery package registered in the package DB 34 to the vehicle system 4.

The configuration information manager 26 has a configuration information registerer 35 (also known as a configuration information registrar) and a configuration information DB 36. The configuration information registerer 35 registers regular/standard configuration information for each vehicle model in the configuration information DB 36. The regular configuration information is configuration information of the vehicle approved by a public institution. The configuration information is identification information regarding the hardware and software of the ECU 20 mounted on the vehicle. The configuration information also includes identification information of a system configuration including a plurality of ECUs 20 and identification information of a vehicle configuration including a plurality of systems. Further, as the configuration information, vehicle constraint information relating to program update may be registered. For example, information such as group information of the ECU 20s, a bus load table, information about battery load, and the like described in the rewriting specification data may be registered.

The individual vehicle information manager 27 includes an individual vehicle information registerer 37, a configuration information confirmer 38, an update confirmer 39, an SMS (Short Message Service) transmission controller 40, and an individual vehicle information DB 41. The individual vehicle information registerer 37 registers the individual vehicle information uploaded from each vehicle in the individual vehicle information DB 41. The individual vehicle information registerer 37 may register the individual vehicle information at the time of vehicle production or sale as an initial value in the individual vehicle information DB 41. The configuration information confirmer 38, when registering the uploaded individual vehicle information, collates/compares the individual vehicle information with the configuration information of the same type vehicle registered in the configuration information DB 36. The update confirmer 39 confirms the presence/absence of a new program update regarding the individual vehicle information, and confirms the presence/absence of a campaign. If the individual vehicle information has been updated, the SMS transmission controller 40 sends a message regarding the update to the corresponding vehicle system 4 by SMS.

The campaign manager 28 has a campaign generator 42, a campaign deliverer 43, an instruction notifier 44, and a campaign DB 45. The campaign generator 42 generates campaign information related to program update, and registers the generated campaign information in the campaign DB 45. The campaign deliverer 43 delivers the campaign information registered in the campaign DB 45 to the vehicle system 4. The instruction notifier 44 notifies the vehicle system 4 of required instructions related to the program update. The portions of the managers 25 to 28 other than the DBs are functions implemented by computer hardware and software.

Figure 20:
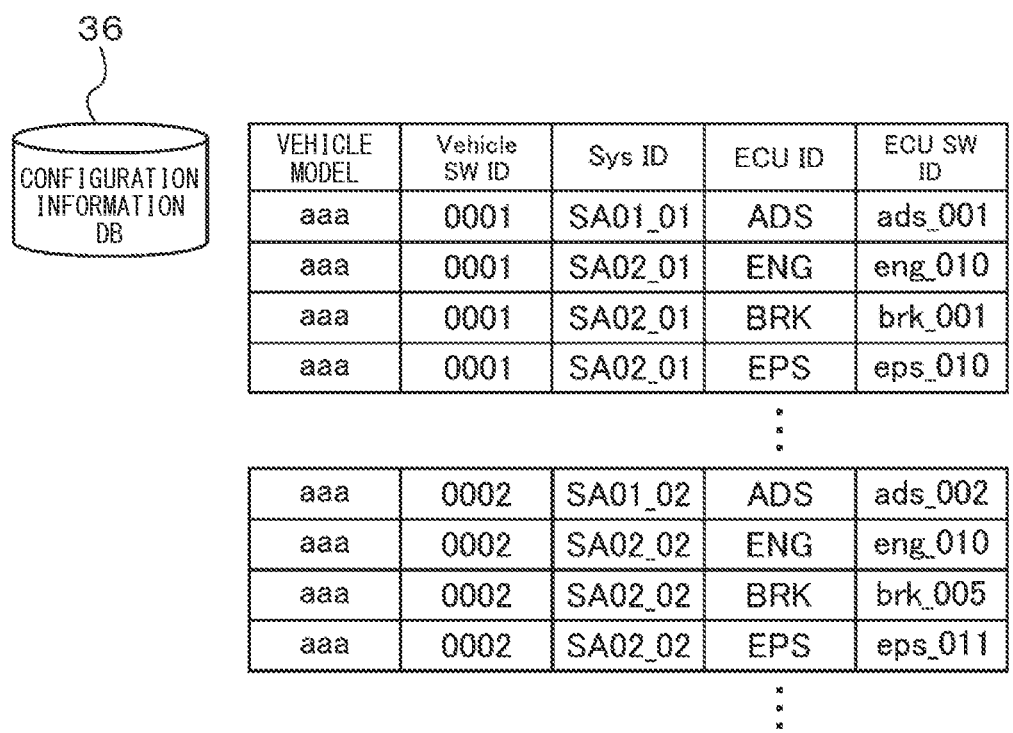
FIG. 20 is a diagram of a configuration information database.

Next, the contents of data registered in each DB are described. As shown in FIG. 20, the following data is registered in the configuration information DB 36, for example. A "Vehicle model" indicates a vehicle type or the like. A "Vehicle SW ID" is a software ID for the entire vehicle, and only one ID is assigned to each vehicle, and is updated in response to an update of version of an application program in one or more ECUs. A "Sys ID" is an ID of a system when a group of multiple ECUs 20 installed in each vehicle is considered as a "system," and is updated in response to an update of version of an application program in one or more ECUs configuring such system.

An "ECU ID" is an ID for identifying a device, which indicates a type of each ECU 20. An "ECU SW ID" is a software ID for each ECU 20, and is updated as version of the application program of the ECU 20 is updated. Also, even if the same "ECU ID" and the same program version are used, different "ECU SW IDs" are used when the hardware configuration is different. That is, the "ECU SW ID" is also information indicating a product number of the ECU 20.

In FIG. 20, a table diagram shows configuration information of a vehicle of "vehicle model"="aaa." Among the ECUs 20 mounted on the vehicle, an automatic driving ECU (ADS), an engine ECU (ENG), a brake ECU (BRK), and an electric power steering ECU (EPS) are illustrated. For example, the "ECU SW IDs" of a "Vehicle SW ID"="0001" are "ads_001", "eng_010", "brk_001", "eps_010", while the "ECU SW IDs" of a "Vehicle SW ID"="0002" are "ads_002", "eng_010", "brk_005", and "eps_011", which means that three software versions have been updated. Along with such update, "Sys ID"="SA01_01" is updated to "SA01_02", and "Sys ID"="SA02_01" is updated to "SA02_02". In such manner, an initial value is registered in the configuration information DB 36 at the time of vehicle production or sale, and then the initial value is updated as the version of the application program of any one or more ECUs is updated. That is, the configuration information DB 36 shows the configuration information that is officially present in the market for each vehicle model.

As shown in FIG. 21, the following programs and data are registered in the ECU reprog data DB 32, for example. In FIG. 21, among the ECUs 20 installed in a certain vehicle model, an automatic driving ECU (ADS), a brake ECU (BRK), and an electric power steering ECU (EPS) are illustrated as the ECU 20 whose application program is updated. Regarding each entry of the latest "ECU SW ID" of these update target ECUs 20, an old program of ECU 20, a new program of ECU 20, integrity check data of the old program, integrity check data of the new program, update data about a difference between the new program and the old program, integrity check data of the update data, rollback data which is also about a difference, integrity check data of the rollback data and the like are registered. The integrity check data is a hash value obtained by applying a hash function to the data value. When the update data is provided as entire program data instead of being provided as difference data, the integrity check data of the update data becomes equal to the same data of the new program. In FIG. 21, the data structure for the latest "ECU SW ID" is shown. However, when the data for the old "ECU SW ID" is stored/saved, the new program of a previous (i.e., one-step old) "ECU SW ID" may be referred to. Further, each integrity check data may be in a format in which a value calculated by the supplier is registered, or in a format in which a value is calculated by the center device 3 is registered.

Figure 22:
FIG. 22 is a diagram of an ECU meta-data database.

As shown in FIG. 22, the ECU metadata DB 33 stores, i.e., registers, the following individual specification data for each ECU, for example. Regarding the latest "ECU SW ID", list includes items such as the size of the update data file, the size of the rollback data file, phase information indicating which of two or more phases (e.g., A/B/C phases) of a flash memory 28b of the ECU 20 the software (i.e., program) is intended for, transfer size, read address at/from which the program file is read, and the like.

Attribute information indicating attributes of the ECU 20 is also registered in the ECU metadata DB 33. The attribute information is information indicating hardware attributes and software attributes regarding the ECU 20. The transfer size is a transfer size when rewrite data is divided and transferred from the CGW 13 to the ECU 20. The key is a key used when the CGW 13 securely accesses the ECU 20. Further, entries identified by the "vehicle model" and the "ECU ID" include a memory configuration of the flash memory 28d in the ECU 20, a bus type to which the ECU 20 is connected, a type of a power source connected to the ECU 20, and the like.

Here, regarding the memory configuration, "one phase" indicates a one-phase single-mode memory having one flash phase, "two phases" indicates a two-phase memory having two flash phases, and "suspend" indicates a one-phase suspend-mode memory having pseudo two phases as the flash phase. The hardware attribute information and the software attribute information are information used for rewriting control of each ECU 20 in the vehicle system 4. The hardware attribute information may be stored in the CGW 13 in advance, but in the present embodiment, in order to reduce the management load on the vehicle system 4, it is managed by the center device 3. The software attribute information is data that directly specifies the rewriting operation of each ECU 20. The center device 3 manages those data for realizing flexible control of the vehicle system 4.

Figure 23:
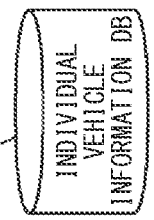
FIG. 23 is a diagram of individual vehicle information database.

As shown in FIG. 23, the following data for each of the individual vehicles is registered in the individual vehicle information DB 41, for example. Mainly, registered data involves (i) the configuration information of the individual vehicle and (ii) status information of the individual vehicle regarding the program update. More specifically, for each entry of "VIN" which is an ID of each vehicle, items of the configuration information are listed such as "Vehicle SW ID", "Sys ID", "ECU ID", "ECU SW ID" and the like. The "Digest" value that is a hash value for these pieces of configuration information is calculated and stored in the center device 3. The "operation phase" indicates a phase in which a currently-operating program executed by the ECU 20 is written when the memory configuration has two phases, and a value uploaded together with the configuration information is registered.

The "access log" indicates date and time when a vehicle uploaded the individual vehicle information to the center device 3. The "reprog status" indicates a status of the reprog in the vehicle, and includes "campaign issued", "activation complete", "download complete" and the like. In other words, the "reprog status" tells to which phase the reprog of the vehicle has progressed and in which phase the reprog is stagnated/jammed. When the vehicle system 4 uploads the configuration information and the like to the center device 3, the "VIN" of each vehicle is added to the information and the like.

Figure 24:
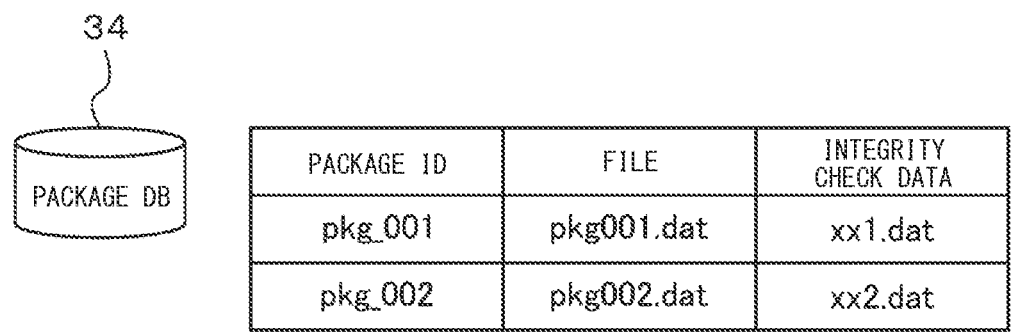
FIG. 24 is a diagram of a package database.
Figure 25:
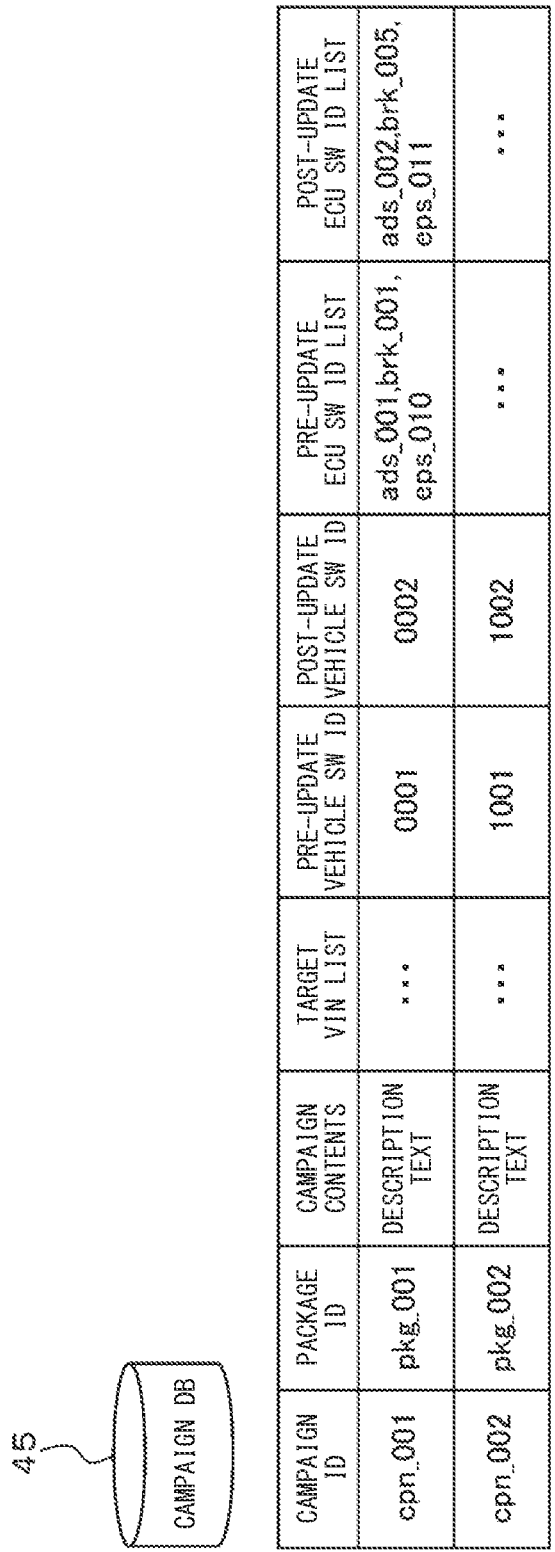
FIG. 25 is a diagram of campaign database.
Figure 26:
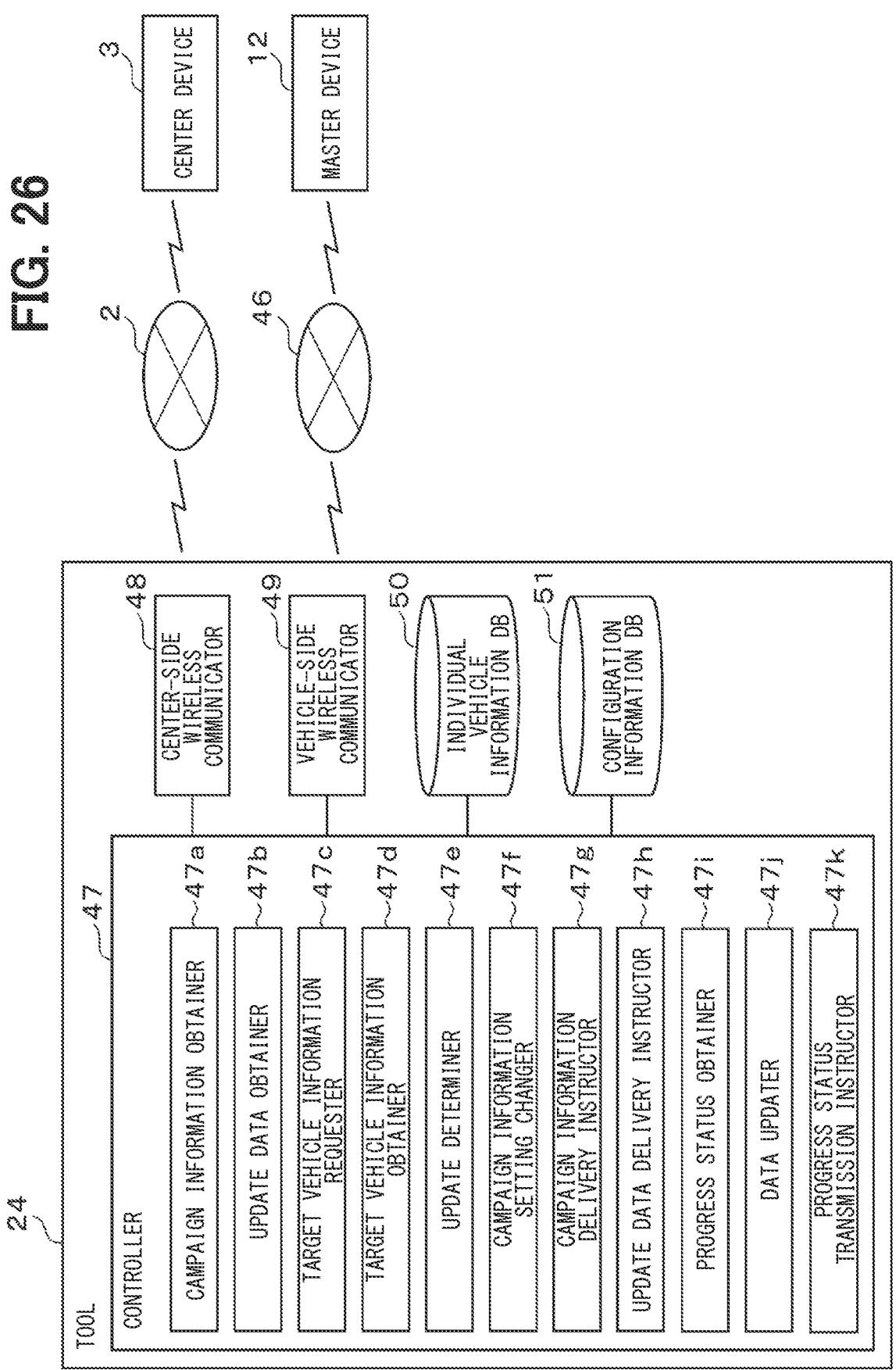
FIG. 26 is a functional block diagram of a tool.
Figure 27:
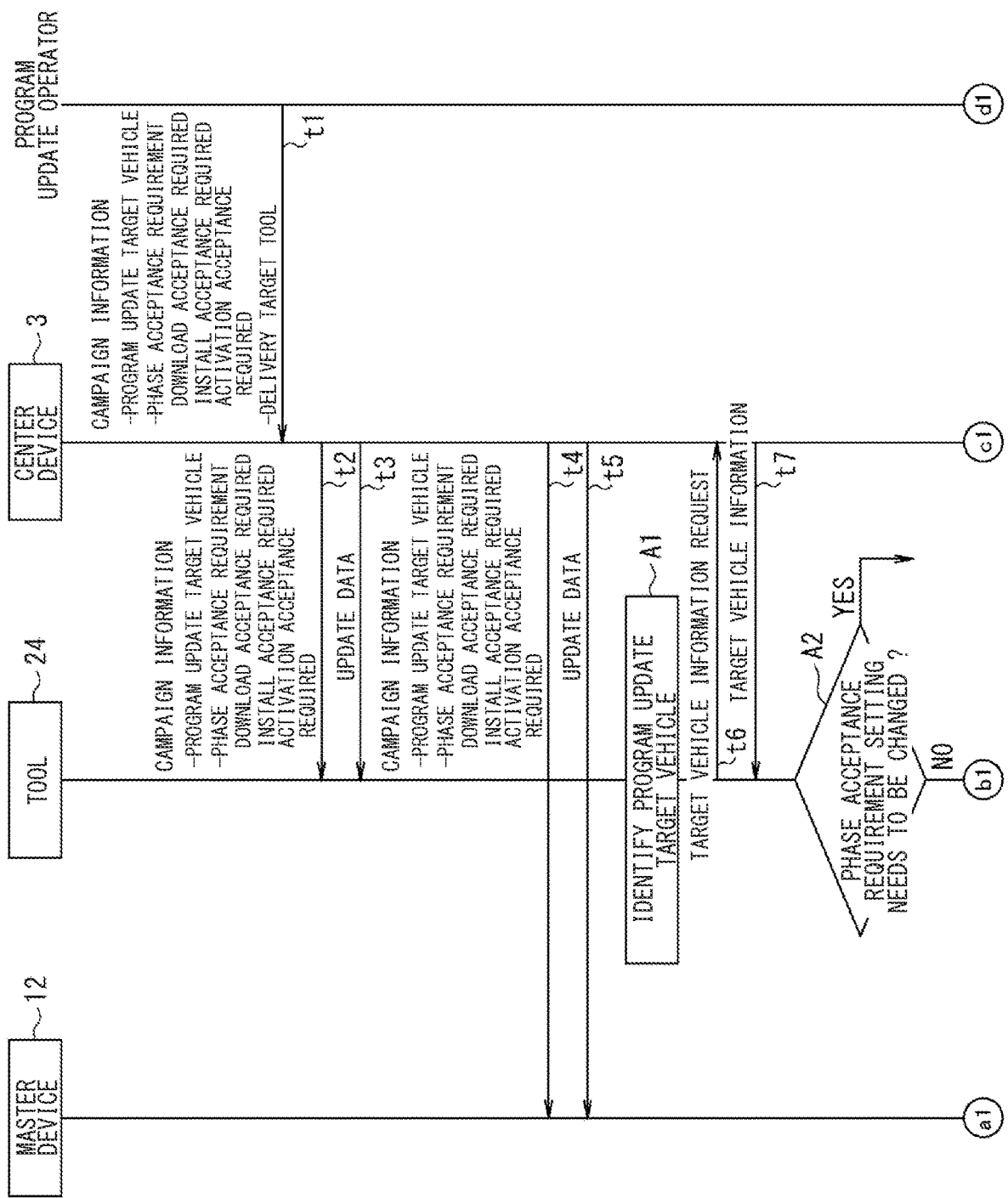
FIG. 27 is a diagram of a flow of processing.

As shown in FIG. 24, a delivery package ID, a delivery package file, and integrity check data of the delivery package are registered in the package DB 34. As shown in FIG. 25, the following data is registered in the campaign DB 45. That is, a campaign information ID, the delivery package ID, message information such as description text showing specific update contents as campaign contents, a list of "VIN" which is the ID of the vehicle targeted for the campaign, "Vehicle SW ID" before and after update, a list of "ECU SW ID" before and after update, and the like are registered. The target VIN list can be registered by collating/comparing the individual vehicle information DB 41 and the campaign DB 45. Note that the campaign information may also be registered in the package DB 34 as well.

When the number of vehicles for which the program is updated becomes extremely large, the processing load of the communication network 2 due to the data communication between the center device 3 and the master device 12 increases. Further, in the center device 3, the processing load related to the management of the campaign information increases. Under such circumstances, it may be desirable to reduce the processing load of the communication network 2 and also reduce the processing load of the center device 3 related to the management of the campaign information. In this regard, the present embodiment adopts the following configuration.

The tool 24 has a function of relaying data between the center device 3 and the master device 12 as described above, and is equipped with functional blocks involved in program update, such as a controller 47, a center-side wireless communicator 48 that performs data communication with the center device 3 via the communication network 2, a vehicle side wireless communicator 49 that performs data communication with the CGW 14 via the short range communication network 46, and an individual vehicle information DB 50, and a configuration information DB 51. The individual vehicle information DB 50 and the configuration information DB 51 held by the tool 24 are equivalent to the individual vehicle information DB 41 and the configuration information DB 36 held by the center device 3 described above. The center device 3 and the tool 24 collate the data stored in the individual vehicle information DBs 50 and 41 to synchronize the individual vehicle information, and collate the data stored in the configuration information DBs 51 and 36 to synchronize the configuration information.

The controller 47 includes a campaign information obtainer 47a, an update data obtainer 47b, a target vehicle information requester 47c, a target vehicle information obtainer 47d, a change determiner 47e, and a campaign information setting changer 47f, a campaign information delivery instructor 47g, an update data delivery instructor 47h, a progress status obtainer 47i, a data updater 47j, and a progress status transmission instructor 47k.

The center device 3 obtains the campaign information when a program update operator in charge inputs the campaign information for the program update. The campaign information that the program update operator inputs by operation includes the target vehicle (VIN) of the program update, whether or not acceptance of the phase is required, and a delivery target tool. When the campaign information includes a delivery target tool, the center device 3 delivers the obtained campaign information to the tool 24 corresponding to the delivery target tool. On the other hand, when the campaign information does not include the delivery target tool, the center device 3 delivers the obtained campaign information to the master device 12 corresponding to the vehicle for which the program is updated.

The campaign information obtainer 47a obtains the campaign information when the center-side wireless communicator 48 receives the campaign information delivered from the center device 3. The update data obtainer 47b obtains the update data as the update data delivered from the center device 3 and received by the center-side wireless communicator 48. When the campaign information is obtained by the campaign information obtainer 47a, the target vehicle information requester 47c identifies a target vehicle for program update from the obtained campaign information, and issues and transmits a target vehicle information request from the center-side wireless communicator 48 to the center device 3, requesting the center device 3 for the individual vehicle information and the configuration information regarding the identified target vehicle.

Upon receiving the target vehicle information request from the tool 24, the center device 3 identifies the target vehicle for program update, extracts (i) the individual vehicle information regarding the identified target vehicle from the individual vehicle information DB 41, and (ii) the configuration information from the configuration information DB 36, and substantially at the same time identifies the vehicle state of the target vehicle for program update, and transmits the extracted individual vehicle information and configuration information and the identified vehicle state to the tool 24 as target vehicle information. The center device 3 identifies, as the vehicle state of the target vehicle for the program update, whether the vehicle is in the user's hand/ possession or is waiting in the yard.

The target vehicle information obtainer 47d obtains the target vehicle information from the center device 3, when the information is received by the target side wireless communicator 48, which includes the individual vehicle information, the configuration information, and the vehicle state regarding the target vehicle.

When the campaign information is obtained by the campaign information obtainer 47a, the change determiner 47e identifies the target vehicle for the program update, and determines whether the campaign information setting needs to be changed according to the identification result. That is, the change determiner 47e determines, for example, that the setting change is unnecessary (i.e., not required) when (A) the campaign information acceptance requirement transmitted from the center device 3 to the tool 24 indicates that (a) download acceptance required, (b) install acceptance required, and (c) activation acceptance required, and (B) the program update target vehicle is in user's possession, which is a situation in which the program update is performed by the user. That is, in other words, since it is desirable for the user to explicitly accept and confirm each phase of the program update by performing an acceptance operation when the target vehicle for the program update has already been delivered to the user in which the user performs the program update, the setting of the campaign information acceptance requirement transmitted from the center device 3 to the tool 24 is kept unchanged, i.e., (a) download acceptance required, (b) install acceptance required, and (c) activation acceptance required all stay as is.

On the other hand, when setting of the acceptance requirement of the campaign information transmitted from the center device 3 to the tool 24 indicates that the acceptance of download is required, the acceptance of installation is required, and the acceptance of activation is required, in case that the target vehicle of the program update is a vehicle waiting in the yard, which is a situation in which a yard worker is in charge of the program update, the change determiner 47e determines, for example, that the acceptance requirement setting needs to be changed from the above.

The campaign information setting changer 47f changes the setting of the campaign information when the change determiner 47e determines that the setting needs to be changed. That is, since the acceptance of each phase of the program update needs not be explicitly performed/confirmed by the acceptance operation in a situation in which the vehicle is still in the yard (i.e., is not in the user's possession) and the yard worker is in charge of the program update, the setting of the acceptance requirement of the campaign information transmitted from the center device 3 to the tool 24 is changed. The campaign information setting changer 47f changes, for example, setting of the download acceptance from acceptance required to acceptance not required (i.e., download acceptance opted-in), setting of the installation acceptance from acceptance required to acceptance not required (i.e., install acceptance opted-in), and the activation acceptance from acceptance required to acceptance not required (i.e., activation acceptance opted-in).

The campaign information delivery instructor 47g instructs the vehicle-side wireless communicator 49 to deliver the campaign information, and causes the vehicle-side wireless communicator 49 to deliver the campaign information to the master device 12 of the target vehicle. The update data delivery instructor 47h instructs the vehicle-side wireless communicator 49 to deliver the update data, and causes the vehicle-side wireless communicator 49 to deliver the update data to the master device 12 of the target vehicle.

The progress status obtainer 47i obtains the progress status of the program update by receiving the progress status of the program update transmitted from the master device 12 by the vehicle-side wireless communicator 49. When the progress status of the program update is obtained by the progress status obtainer 47i, the data updater 47j updates the data in the individual vehicle information DB 50 and the configuration information DB 51. That is, the data updater 47j updates the reprog status in the individual vehicle information DB 50 and updates the "ECU SW ID" in the configuration information DB 51.

When the progress status of the program update is obtained by the progress status obtainer 47i, the progress status transmission instructor 47k instructs the center-side wireless communicator 48 to transmit the obtained progress status of the program update, and the progress status of the program update is transmitted from the center-side wireless communicator 48 to the center device 3.

Next, operation of the above configuration will be described with reference to FIGS. 27 to 30. When the program update operator inputs the campaign information for program update and obtains the campaign information for program update, the center device 3 identifies the delivery target tool if the delivery target tool is included in the obtained campaign information, and delivers the obtained campaign information to the tool 24 corresponding to the identified delivery target tool (t2 in FIG. 27). Further, the center device 3 delivers the update data to the tool 24 corresponding to the delivery target tool (t3 in FIG. 27).

On the other hand, when the obtained campaign information does not include the delivery target tool, the center device 3 identifies a target vehicle for the program update, and delivers the obtained campaign information to the master device 12 corresponding to the target vehicle for the program update. (t4 in FIG. 27). Further, the center device 3 delivers the update data to the master device 12 corresponding to the target vehicle for the program update (t5 in FIG. 27).

When the tool 24 obtains the campaign information by receiving the campaign information delivered from the center device 3 by the center-side wireless communicator 48 (corresponding to the campaign information obtaining procedure), the tool 24 identifies the target vehicle for the program update included in the campaign information (A1), causes the center-side wireless communicator 48 to transmit a target vehicle information request to the center device 3 (t6), for requesting the center device 3 for the individual vehicle information and the configuration information regarding the identified target vehicle.

When the tool 24 receives the target vehicle information transmitted from the center device 3 by the center-side wireless communicator 48 (t7), the tool 24 determines whether or not setting of phase acceptance requirement needs to be changed (A2, change determination procedure).

Figure 28:
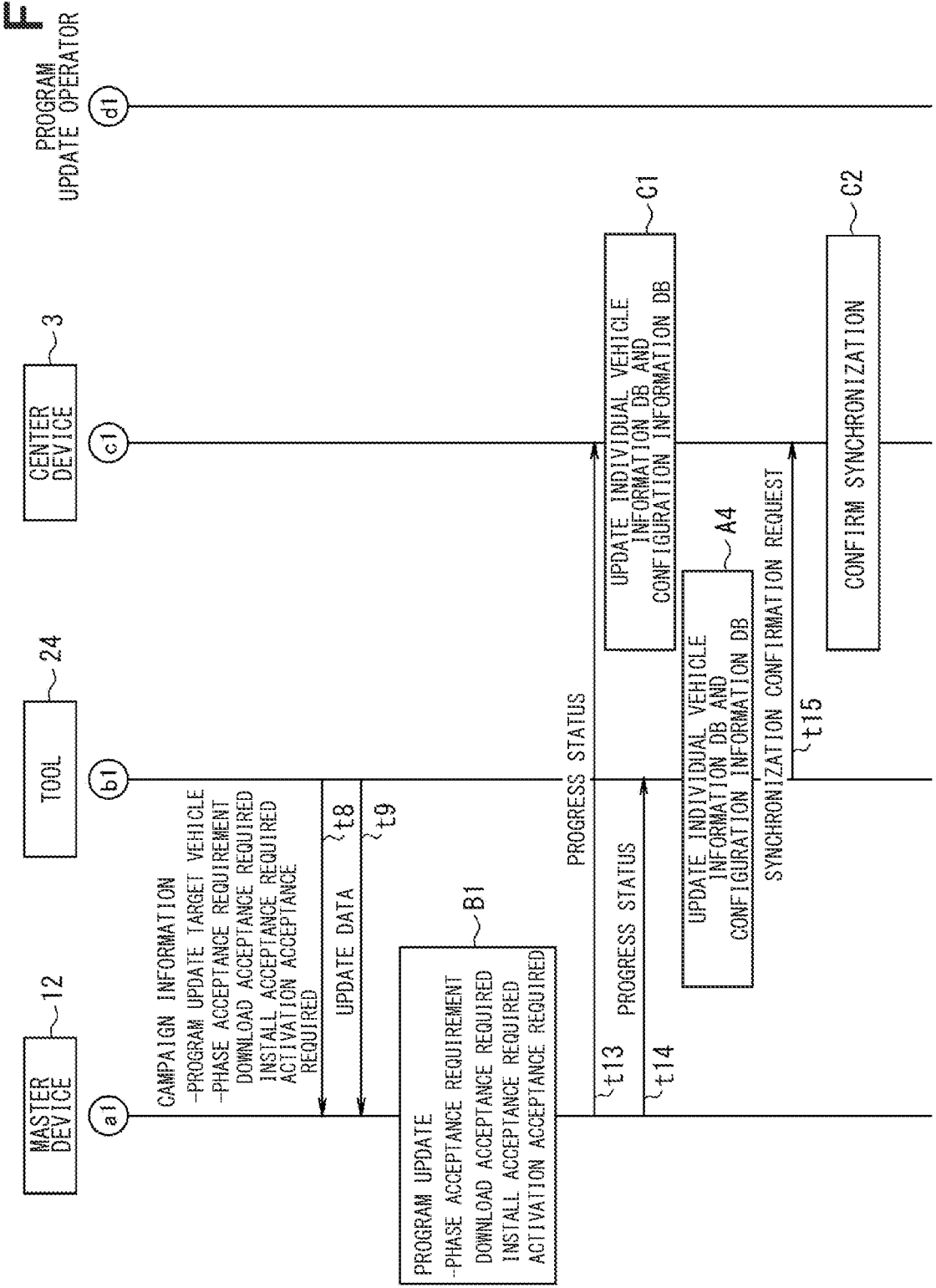
FIG. 28 is a diagram of another flow of processing.
Figure 29:
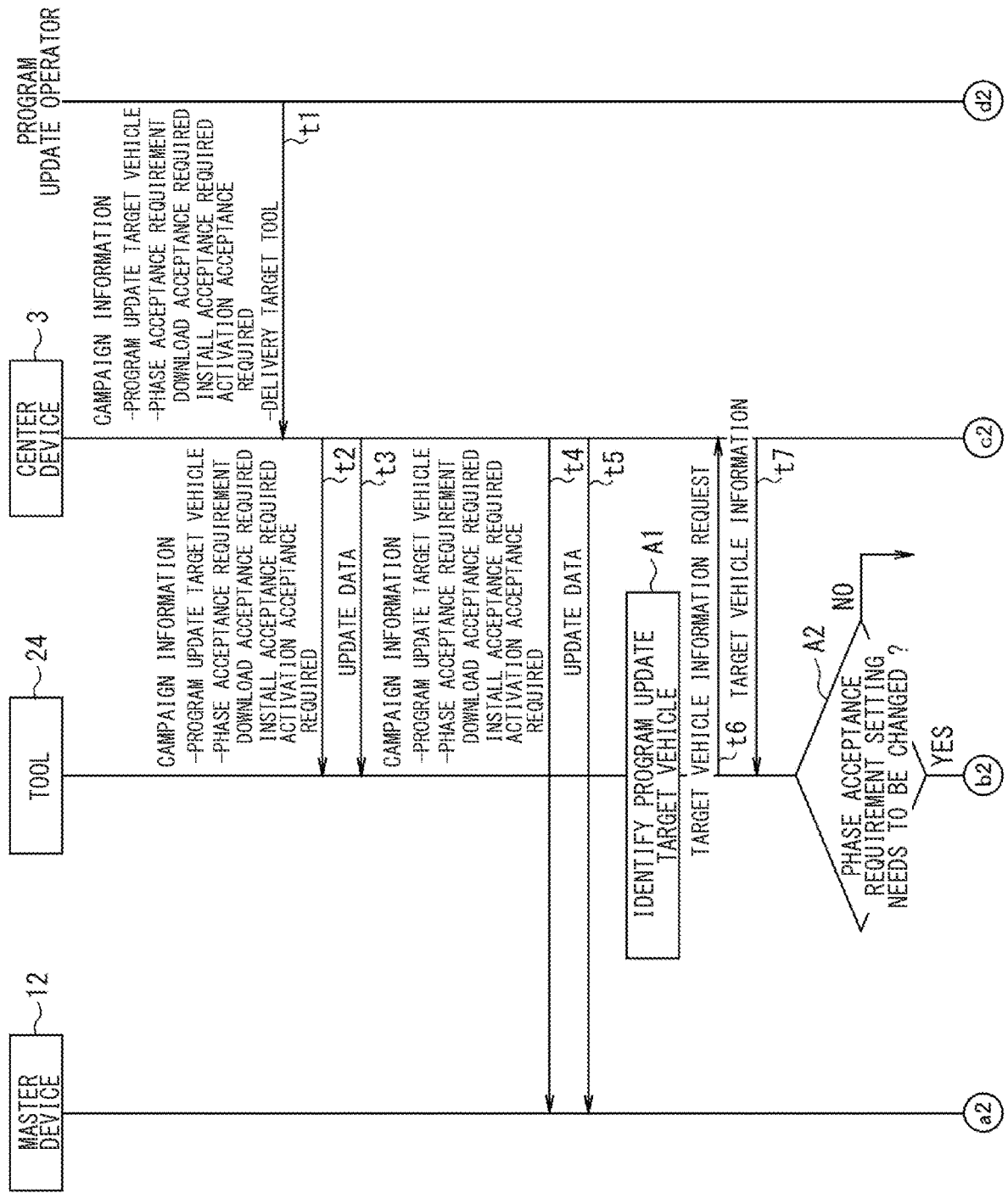
FIG. 29 is a diagram of yet another flow of processing.

The tool 24 does not change the setting of the phase acceptance requirement by determining that such change is not required (A2:NO) when (A) the setting of the acceptance requirement of the campaign information transmitted from the center device 3 to the tool 24 indicates that the acceptance of download is required, the acceptance of installation is required, and the acceptance of activation is required, and (B) the target vehicle for the program update is in the user's possession which obliges the user to perform the program update. Thereafter, as shown in FIG. 28, the tool 24 delivers the campaign information to the master device 12 of the target vehicle (t8) and the update data to the master device 12 of the target vehicle (t9).

Upon receiving the campaign information transmitted from the tool 24, the master device 12 of the target vehicle for the program update starts the program update according to the received campaign information (B1). That is, the master device 12 starts the program update with the setting: (a) download acceptance required, (b) installation acceptance required, and (c) activation acceptance required. That is, the program update completes up to the activation phase when the user performs (a) download acceptance operation, (b) install acceptance operation, and (c) activation acceptance operation.

On the other hand, the tool 24 determines that the phase acceptance requirement needs to be changed when (A) the setting of the acceptance requirement of the campaign information transmitted from the center device 3 to the tool 24 indicates that the acceptance of download is required, the acceptance of installation is required, and the acceptance of activation is required, and (B) the target vehicle for the program update is in the yard requiring the yard worker to perform the program update, and, as shown in FIG. 30, changes the setting of the phase acceptance requirement (A3, which corresponds to a campaign information setting change procedure). The tool 24, for example, changes the setting of download acceptance from acceptance required to not required, the setting of installation acceptance from acceptance required to not required, and the setting of activation requirement from acceptance required to not required. When the setting of acceptance requirement of the phase is changed as described above, the tool 24 transmits a setting change notification capable of specifying the changed setting to the center device 3 (t10). After this, the tool 24 delivers the campaign information to the master device 12 of the target vehicle (t11, which corresponds to a campaign information delivery instruction procedure), and delivers the update data to the master device 12 of the target vehicle (t12, which corresponds to an update data delivery instruction procedure).

Upon receiving the campaign information transmitted from the tool 24, the master device 12 of the target vehicle for the program update starts the program update according to the received campaign information (B2 in FIG. 30). That is, the master device 12 starts the program update with the following setting of acceptance requirement: download acceptance not required, installation acceptance not required, and activation acceptance not required. That is, the program update is complete up to the activation phase, without requiring the yard worker to perform the download acceptance operation, the installation acceptance operation, and the activation acceptance operation.

When the master device 12 starts the program update as described above, the master device 12 transmits the progress status of the program update to the center device 3 and the tool 24 (t13, t14). Upon receiving the progress status transmitted from the master device 12, the center device 3 updates the individual vehicle information DB 41 and the configuration information DB 36 according to the received progress status (C1). Upon receiving the progress status transmitted from the master device 12, the tool 24 updates the individual vehicle information DB 50 and the configuration information DB 51 according to the received progress status (A4), and issues and transmits a synchronization confirmation request from the center-side wireless communicator 48 to the center device 3 (t15). When the center device 3 receives the synchronization confirmation request transmitted from the tool 24, the center device 3 collates/compares (i) the individual vehicle information DB 41 and the configuration information DB 36 held therein and (ii) the individual vehicle information DB 50 and the configuration information DB 51 held in the tool 24, to confirm synchronization (C2).

In the above-described configuration, when the delivery target tool is designated/addressed in the campaign information, the center device 3 does not directly deliver the campaign information and the update data to the master device 12, but the center device 3 delivers the campaign information and the update data to the tool 24 corresponding to the target tool, and the tool 24 delivers the campaign information and the update data to the master device 12. That is, since the tool 24 functions as an edge server, the processing load of the communication network 2 between the center device 3 and the master device 12 is reducible. Further, by providing the tool 24 with the function of changing the setting of the campaign information, the processing load of the center device 3 related to the management of the campaign information is reducible. That is, since the tool 24 determines whether or not the acceptance of the phase is required according to the vehicle state, the center device 3 can deliver the campaign information to the tool 24 with the phase acceptance requirement simply/uniformly set to an initial value.

In the present embodiment, it is assumed that the campaign information is targeted to the vehicle that is in the user's possession, and an example of the initial value of the phase acceptance requirement uniformly set as required (i.e., download acceptance required, installation acceptance required, and activation acceptance required) is shown. However, when assuming that the campaign information is for the target vehicle waiting shipment in the yard, the initial value of the phase acceptance requirement may uniformly be set to as not required (i.e., download acceptance not required, installation acceptance not required, and activation acceptance not required). That is, when the initial value of phase acceptance requirement is set to download acceptance not required, installation acceptance not required, and activation acceptance not required, change of the acceptance requirement setting is determined as necessary for a target vehicle in user's possession or is determined as unnecessary for a target vehicle still waiting in the yard.

Further, in the present embodiment, when the campaign information includes the delivery target tool, the campaign information and the update data are delivered from the center device 3 only to the tool 24 corresponding to the delivery target tool. However, the campaign information and the update data may be delivered to the tool 24 corresponding to the delivery target tool, and the campaign information and the update data may also be delivered to the master device 12 corresponding to the program update target vehicle. In such case, since the master device 12 receives the campaign information delivered from the center device 3 and the campaign information delivered from the tool 24, the master device 12 may have freedom of choice in terms of which one of the campaign information (from the center device 12 or from the tool 24) to choose and adopt.

Further, the tool 24 may determine, when changing the setting of phase acceptance requirement from "acceptance required" to "acceptance not required", up to which phase the setting needs to be changed, by taking into consideration the following factors of the target vehicle for the program update, such as a remaining battery power, communication environment, time required to execute a phase, and the like. For example, in case that the remaining battery power is sufficient to successfully complete the download phase, but is not sufficient to successfully complete the installation phase, the acceptance requirement of the download phase may be changed from acceptance required to acceptance not required, while refraining to change the installation and activation phase settings from acceptance required to acceptance not required.

As described above, according to the present embodiment, the following operational effects are achievable. When the tool 24 receives the campaign information from the center device 3, by determined whether or not the setting of the received campaign information needs to be changed and when determining that the setting of the campaign information needs to be changed, the setting of the received campaign information is changed before the campaign information is delivered to the master device 12, and the update data received from the center device 3 is delivered to the master device 12. The center device 3 does not directly deliver the campaign information and the update data to the master device 12, but the tool 24 delivers the campaign information and the update data received from the center device 3 to the master device 12, thereby reducing the processing load of the communication network 2. Further, the tool 24 can change the setting of the campaign information received from the center device 3, thereby reducing the processing load of the center device 3 relating to the management of the campaign information. As a result, the processing load of the communication network 2 is reducible and the processing load of the center device 3 related to the management of the campaign information is reducible as well, while appropriately performing the program update.

The tool 24 is configured to be capable of changing the setting of the campaign information so that the acceptance requirement of at least one of the download phase, the installation phase, and the activation phase is changed. Therefore, the setting of acceptance requirement in each of the download phase, the installation phase, and the activation phase is appropriately changeable.

While the present disclosure has been described based on the embodiment, the present disclosure is not limited to the embodiment or structure described herein. The present disclosure encompasses various modifications and variations within the scope of equivalents. Additionally, various combinations and configurations, as well as other combinations and configurations including more, less, or only a single element thereof, are within the scope and spirit of the present disclosure. The center device 3 may have the function of the OEM server 11. Although the tool 24 is illustrated as a data relay device, for example, a smartphone or a computer terminal installed in a dealer or the like may have the function of the data relay device. That is, the data relay device may be a terminal that can be used while being carried by a dealer operator, or a terminal that is fixedly/stationarily installed. Though a case has been exemplified in which the acceptance requirement of all of the download phase, the installation phase, and the activation phase is changed, the acceptance requirement of at least one of these phases may be changed.

Though an example is shown about a configuration that identifies the vehicle state of the target vehicle of the program update regarding whether the target vehicle is in the user's possession or is waiting in the yard, and determines whether or not the setting of the campaign information needs to be changed according to the identification result. However, according to the characteristics of the tool 24, whether or not the setting of the campaign information needs to be changed may be determined. For example, when the tool 24 is pre-configured for use in the yard, change of the setting of the acceptance requirement may be determined as required or not so that the download phase, the installation phase, and the activation phase all do not require acceptance.

The control scheme and method described in the present disclosure may be implemented by a special purpose computer which is configured with a memory and a processor programmed to perform one or more functions embodied in computer programs stored in the memory. Alternatively, the control scheme and method thereof described in the present disclosure may be implemented by a special purpose computer configured as a processor with one or more dedicated hardware logic circuits. Alternatively, the control scheme and method described in the present disclosure may be implemented by one or more dedicated, special purpose computers, which are configured as a combination of (i) a memory and a processor programmed to perform one or more functions and (ii) a processor with one or more hardware logic circuits. The computer program may also be stored on a computer readable non-transitory, tangible recording medium as instructions to be executed by a computer.

What is claimed is:

1. A vehicle electronic control system comprising:
a center device for delivering update data related to a program update;
a master device for instructing a target electronic control device to which the program update of a program is rewritten as the update data; and
a data relay device capable of performing data communication between the center device and the master device,
wherein the vehicle control system is configured such that:
the center device obtains campaign information of the program update, transmits the obtained campaign information to the data relay device, and transmits the update data to the data relay device,
when the data relay device receives the campaign information from the center device, the data relay device changes setting of the received campaign information and delivers the campaign information to the master device, and, when the data relay device receives the update data from the center device, the data relay device delivers the received update data to the vehicle master device, and
when the master device receives the campaign information from the data relay device, the master device instructs the target electronic control device to update the program with the update data received from the data relay device according to the received campaign information.

2. The vehicle electronic control system according to claim 1, wherein
when the data relay device receives the campaign information from the center device, the data relay device determines whether it is necessary to change the setting of the received campaign information, and when it is determined that change of the setting of the campaign information is necessary, the data relay device changes the setting of the received campaign information and delivers the information to the master device.

3. The vehicle electronic control system according to claim 2, wherein
when the data relay device determines that change of the setting of the campaign information is not necessary, the received campaign information is delivered to the master device without change of the setting.

4. The vehicle electronic control system according to claim 2, wherein
when the data relay device receives the campaign information from the center device, the data relay device identifies the target vehicle for the program update based on the received campaign information, and determines whether or not it is necessary to change the setting of the campaign information according to the identification result.

5. The vehicle electronic control system according to claim 1, wherein
the data relay device changes the setting of the campaign information received from the center device to change an acceptance requirement of a phase.

6. The vehicle electronic control system according to claim 5, wherein
the data relay device is configured to change the acceptance requirement of a phase so that the acceptance requirement includes at least one of: a download phase, an installation phase, and an activation phase,
wherein the download phase enables the master device to download the update data from the center device,
the installation phase enables the master device to instruct the target electronic control device to have the update data written thereto, and
the activation phase enables the target electronic control device to validate the update data.

7. The vehicle electronic control system according to claim 1, wherein
the center device obtains the campaign information for the program update, and transmits the obtained campaign information to the data relay device and also to the master device.

8. The vehicle electronic control system according to claim 1, wherein:

the master device transmits a progress status of the program update to the data relay device, and the data relay device, when receiving the progress status of the program update from the master device, transmits the progress status of the received program update to the center device.

9. The vehicle electronic control system according to claim 8, wherein the master device transmits the progress status of the program update to the data relay device and also to the center device.

10. A data relay device capable of performing data communication between a center device for delivering update data related to a program update and a master device for instructing a target electronic control device to which the program update is written as the update data, the data relay device comprising:

a campaign information obtainer obtaining campaign information of the program update from the center device;

an update data obtainer obtaining the update data from the center device;

a change determiner determining whether or not it is necessary to change the setting of the campaign information received by the campaign information obtainer, a campaign information setting changer changing the setting of the campaign information when it is determined as necessary to change the setting of the campaign information by the change determiner;

a campaign information delivery instructor instructing delivery of the campaign information to the master device, the setting of the to-be-delivered campaign information having been changed by the campaign information setting changer; and an update data delivery instructor instructing delivery of the update data obtained by the update data obtainer to the master device.

11. A campaign information delivery control method for delivery of campaign information from a data relay device capable of performing data communication between a center device for delivering update data related to a program update, and a master device for instructing a target electronic control device to which the program update of a program is rewritten as the update data, the method comprising:

a campaign information obtaining procedure obtaining campaign information of the program update from the center device;

an update data obtaining procedure obtaining the update data from the center device, a change determination procedure determining whether or not it is necessary to change setting of the campaign information obtained by the campaign information obtaining procedure;

a campaign information setting change procedure changing the setting of the campaign information when the necessity of changing the setting of the campaign information is determined by the change determination procedure;

a campaign information delivery instruction procedure instructing delivery of the campaign information to the master device, the setting of the to-be-delivered campaign information having been changed by the campaign information setting change procedure; and an update data delivery instruction procedure instructing delivery of the update data to the master device.

12. A non-transitory, computer-readable storage medium storing a delivery control program for controlling delivery of campaign information of a program update and update data from a data relay device, wherein the delivery control program is configured for performing data communication between a center device and a master device for instructing a target electronic control device to which the program update of a program is rewritten as the update data, wherein the delivery control program includes computer-readable instructions for causing a processor to:

a campaign information obtaining procedure obtaining campaign information of the program update from the center device;

an update data obtaining procedure obtaining the update data from the center device, a change determination procedure determining whether or not it is necessary to change setting of the campaign information obtained by the campaign information obtaining procedure;

a campaign information setting change procedure changing the setting of the campaign information when the necessity of changing the setting of the campaign information is determined by the change determination procedure;

a campaign information delivery instruction procedure instructing delivery of the campaign information to the master device, the setting of the to-be-delivered campaign information having been changed by the campaign information setting change procedure; and an update data delivery instruction procedure instructing delivery of the update data to the master device.

* * * * *